United States Patent [19]

Ishikawa et al.

[11] Patent Number: 5,134,429
[45] Date of Patent: Jul. 28, 1992

[54] INSTANT PHOTOGRAPHIC APPARATUS

[75] Inventors: Masahiro Ishikawa, Yokohama; Koji Ozaki; Harumitsu Mashiko, both of Tokyo; Takashi Seto, Ayase; Kazuhisa Takahashi, Murata; Fumihiko Hoshi, Sendai, all of Japan

[73] Assignee: Ricoh Company, Ltd., Tokyo, Japan

[21] Appl. No.: 686,605

[22] Filed: Apr. 17, 1991

[30] Foreign Application Priority Data

Apr. 17, 1990 [JP] Japan .................. 2-100827

[51] Int. Cl.⁵ .............................................. G03D 3/08
[52] U.S. Cl. ...................... 354/304; 354/86; 354/312
[58] Field of Search .......... 354/276, 280, 281, 283, 354/284, 312, 86, 304

[56] References Cited

U.S. PATENT DOCUMENTS

| | | | |
|---|---|---|---|
| 2,467,320 | 4/1949 | Land | 354/86 |
| 2,638,838 | 5/1953 | Bachelder et al. | 354/86 |
| 3,165,046 | 1/1965 | Land et al. | 354/86 |
| 3,344,730 | 10/1967 | Bartlett et al. | 354/312 |
| 3,364,835 | 1/1968 | Brackett et al. | 354/312 |
| 4,019,194 | 4/1977 | Cutler, Jr. et al. | 354/312 |

Primary Examiner—Richard A. Wintercorn
Assistant Examiner—D. Rutledge
Attorney, Agent, or Firm—Oblon, Spivak, McClelland, Maier & Neustadt

[57] ABSTRACT

A peel-apart type instant photographic apparatus using a negative film and a positive sheet. The apparatus has a dark box for developing and accommodating the negative film and positive sheet, or supply, joined together and having a developer spread therebetween. The dark box is removable from the apparatus body and, therefore, easy to clean and handle. When the dark box is not mounted on the apparatus body in predetermined conditions, a printing operation is inhibited to eliminate the waste of negative sheets and positive sheets. A printing operation is also inhibited when the supply is left in the dark box.

6 Claims, 32 Drawing Sheets

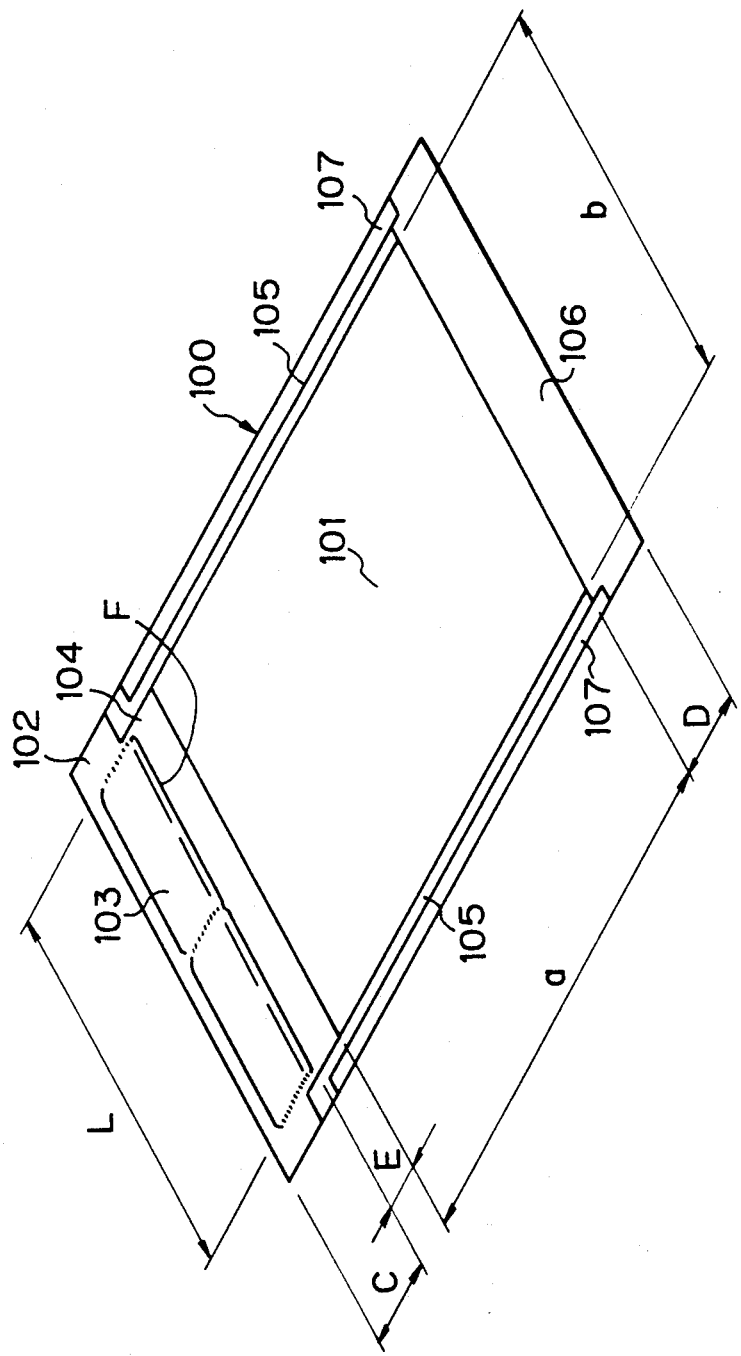

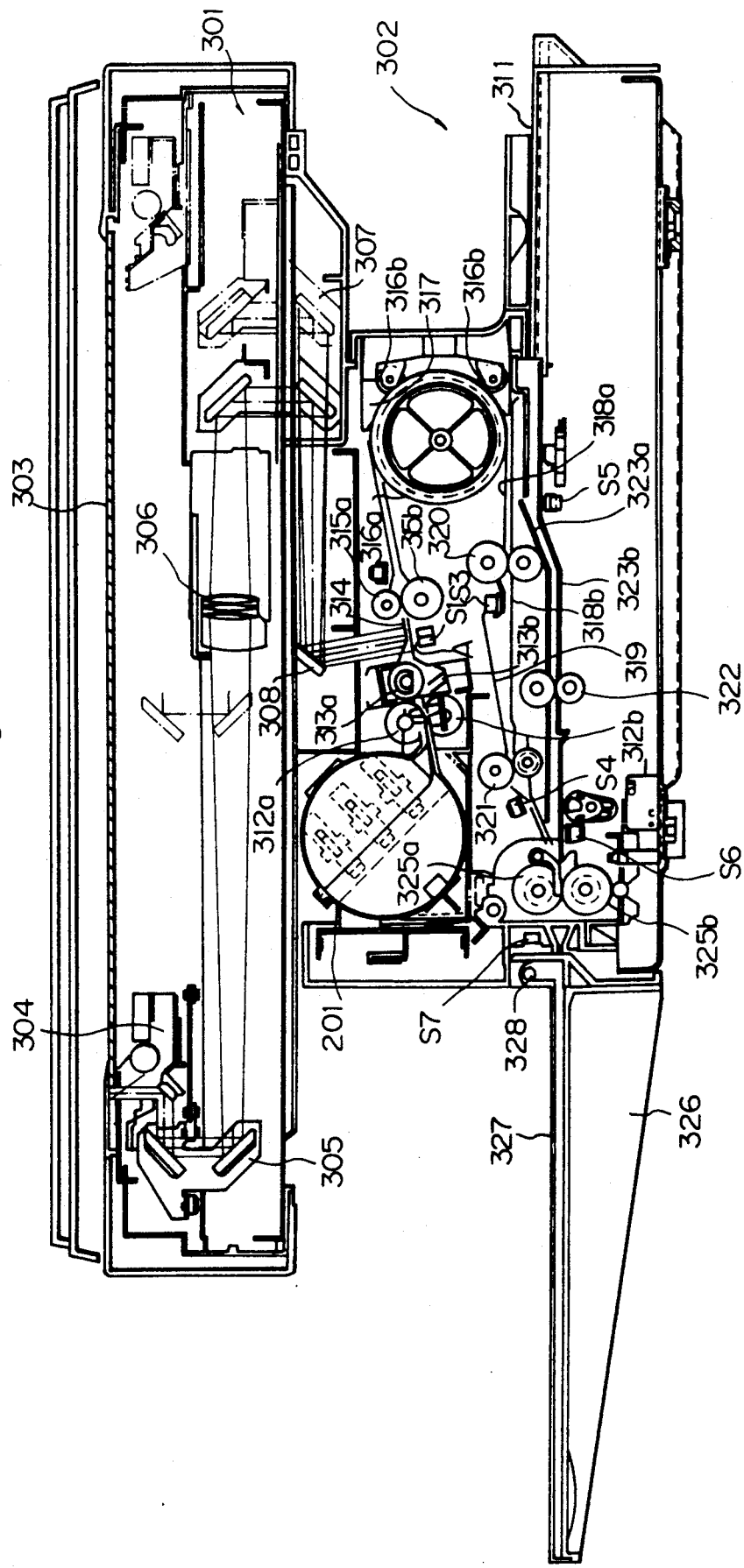

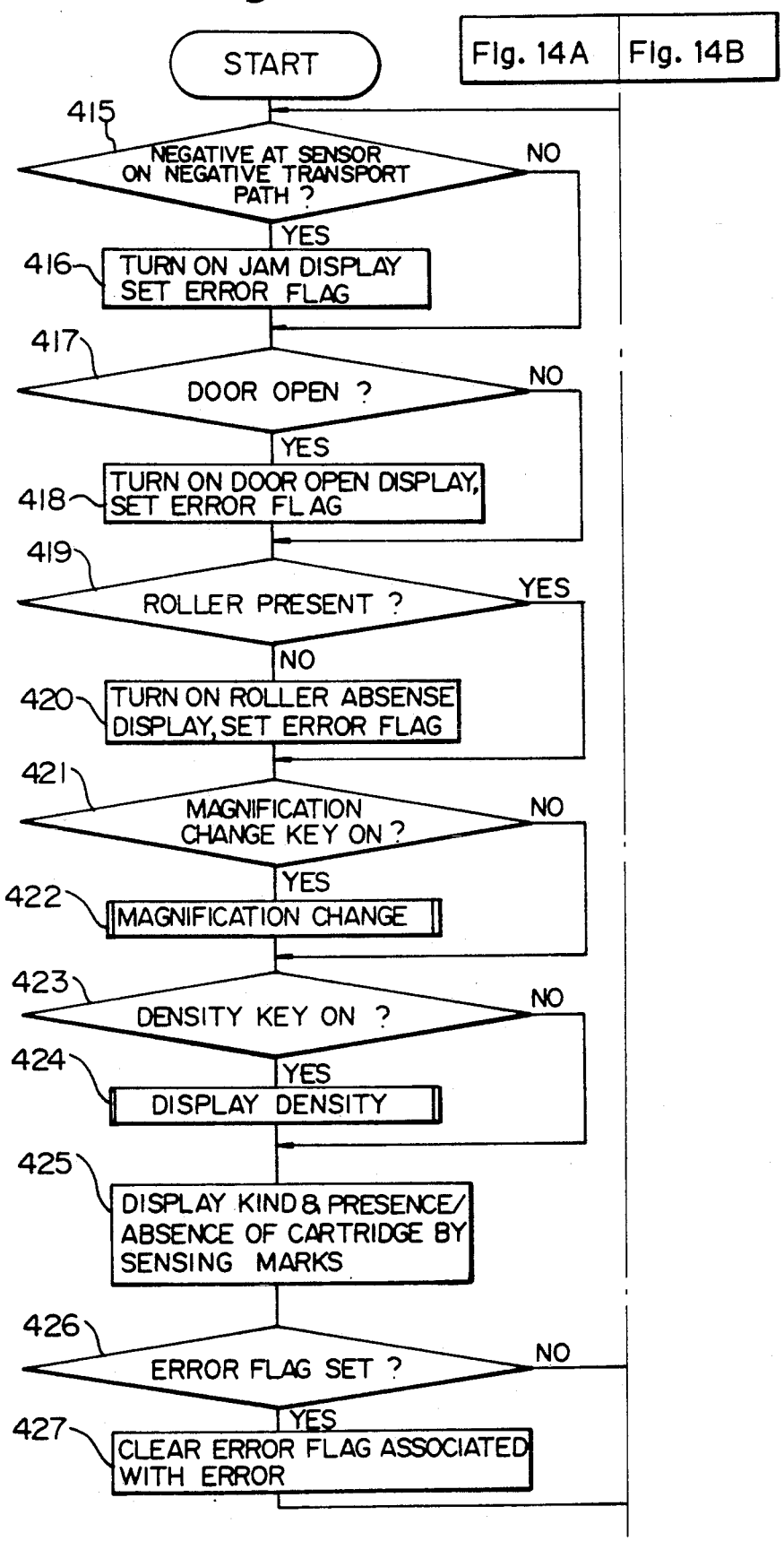

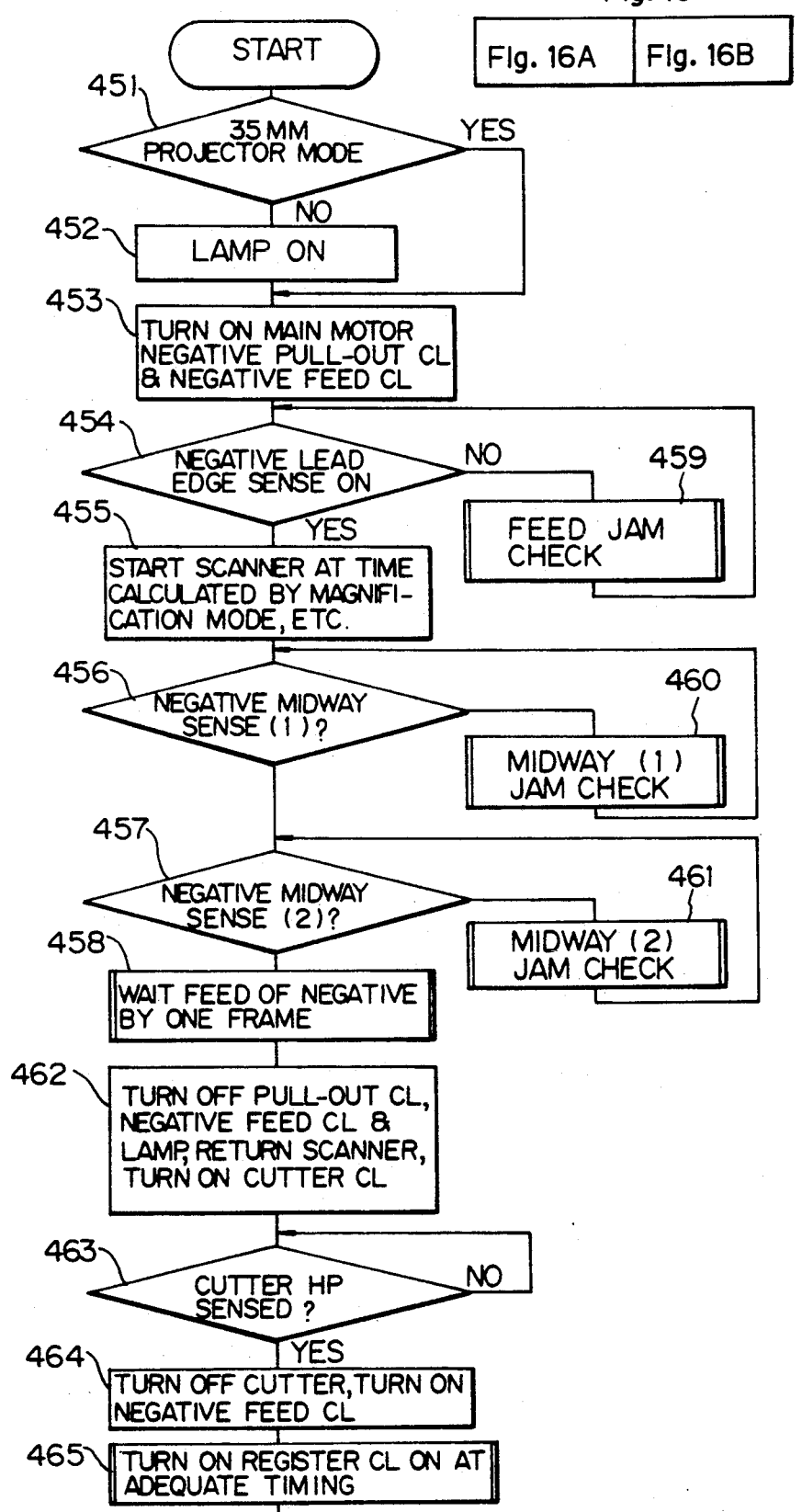

INSTANT PHOTOGRAPHIC APPARATUS

BACKGROUND OF THE INVENTION

The present invention relates to a peel-apart type instant photographic apparatus using the combination of a negative film and a positive sheet as a supply and, more particularly, to an instant photographic apparatus promoting easy handling of a dark box which receives the supply after the spread of a developer.

A photographic apparatus of the type described in usually operable with a supply in the form of the combination of a negative film and a positive sheet. A peel-apart type instant camera, for example, has a relatively small size and uses a relatively small supply, i.e., small negative film and small positive sheet. Such a negative film and a positive sheet are put on the mark as a pack film. However, when the size of the pack film is increased to extend its applicability to a relatively large-size instant photographic apparatus, it is not easy to handle. It is a common practice with a large-size instant photographic apparatus to separate a negative film and a positive sheet from each other and load each of them in the apparatus in a particular condition. The positive sheet is usually implemented as a positive sheet assembly including a pod filled with a developer, a trap mask for collecting excessive part of the developer having been spread, and other auxiliary parts. On the other hand, the negative film is used in the form of a roll and loaded in a cartridge which is set in the apparatus.

After the negative film has been exposed and then laid on a positive sheet, thye developer sealed in the pod is spread. The joined negative film and positive sheet are left in this condition for a predetermined period of time to effect a developing process. As the predetermined time expires, the negative film is peeled apart from the positive film to end the image forming procedure. A prerequisite with the developing process is that the negative film be sheilded from light until a period of time long enough to protect the resultant image from disturbance even when unexposed silver halide on the photosensitive surface of the negative film receives light expires (about one half or less of the developing time; about 30 seconds to 40 seconds). Some different approaches are available in order to meet the above requirement such as effecting the developing process in a dark place, providing a screening layer (black) on the rear surface of the positive sheet so that the sheet may be left in a light place, and, when the positive sheet is transparent for implementing OHP, dispersing carbon in the developer for shielding light.

When the black screening layer is provided on the rear surface of the positive sheet, a white coating is further provided on the black layer to allow necessary data to be written down and to enhance attractive appearance. The problem with this kind of scheme is, therefore, that the rear surface of the positive sheet bears the color of light gray which is not attractive. The positive sheet has to be provided with a substantial thickness since should it be thin, the black rear surface would show itself on the front surface or image receiving surface to cause the whole image to appear dark. Further, the extra coating on the positive sheet not only increases the cost but also requires the production line to have various complicated implementations such humidity control against curls.

Further, dispersing carbon in the developer is not desirable since carbon degrades color reproducibility. Moreover, in the production aspect, carbon has to be dispersed in a uniform distribution, resulting in the need for complicated production steps.

To eliminate the problems particular to the sheilding schemes of the kind stated above, a dark box may be located downstream of developing rollers for accommodating a supply whose developer has been spread, as proposed in, for example, Japanese Patent Laid-Open Publication No. 76029/1977. With such a dark box, it is possible to fully protect the supply or positive sheet from light without resorting to the traditional light shielding schemes.

The conventional instant photographic apparatus with a dark box, however, has various problems left unsolved, as follows. Since the supply after the spread of the developer is stored in the dark box until the development is fully completed, it occupies the entire appartus body until the development completes (1 minunte to 4 minutes, depending on the film). This increases the waiting time or interval between successive printing operations. The apparatus body is ready to operate even when the supply is left in the dark box. It is likely, therefore, that the operator effects the next printing operation while the development is under way or forgetting to remove the developed supply from the dark box. Then, the expensive negative film and positive sheet are simply wasted. When the development is effected with the lid of the dark box held open, as is likely with the conventional apparatus, the negative sheet and positive sheet are also wasted. Desprite that the developer is apt to smear the dark box and apparatus body, they cannot be readily cleaned since the dark box is incorporated in the apparatus body. The smear would contaminate the rear surface of a positive sheet and/or the operator's hand at the time of next printing operation.

SUMMARY OF THE INVENTION

It is therefore an object of the present invention to provide an instant photographic apparatus which promotes easy cleaning and handling of a dark box.

It is another object of the present invention to provide an instant photographic apparatus which eliminates the waste of negative films and positive sheets ascribable to development which may be effected without a dark box being held in accurate conditions or ascribable to a printing operation which may be effected with a supply being left in the dark box.

It is another object of the present invention to provide a generally improved instant photographic apparatus.

A peel-apart type instant photographic apparatus using a combination of a negative film and a positive sheet of the present invention comprises developing rollers, and a dark box removably mounted on the body of the appartus downstream of the developing rollers for developing and accommodating a negative film and a positive sheet joined with each other and having a developer spread therebetween.

BRIEF DESCRIPTION OF THE DRAWINGS

The above and other objects, features and advantages of the present invention will become more apparent from the following detailed description taken with the accompanying drawings in which:

FIGS. 1A through 1C show a positive sheet assembly applicable with which a preferred embodiment of the instant photographic apparatus in accordance with the present invention is practicable;

FIG. 3 shows the general construction of an instant photographic apparatus;

DESCRIPTION OF THE PREFERRED EMBODIMENT

A preferred embodiment of the instant photographic apparatus in accordance with the present invention will be described with reference to the accompanying drawings.

[I] Positive Sheet Assembly

Figure 1B:
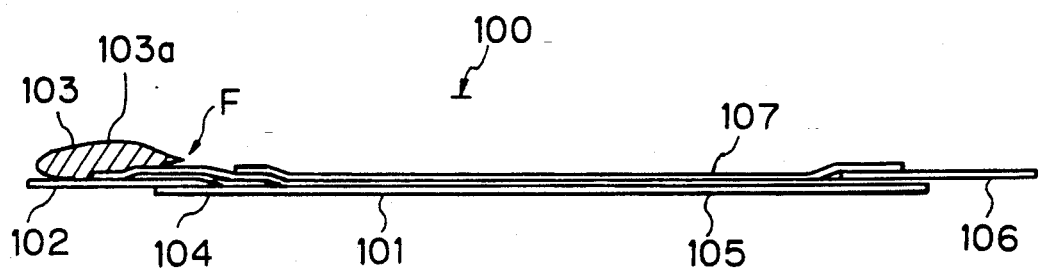
Figure 1C:
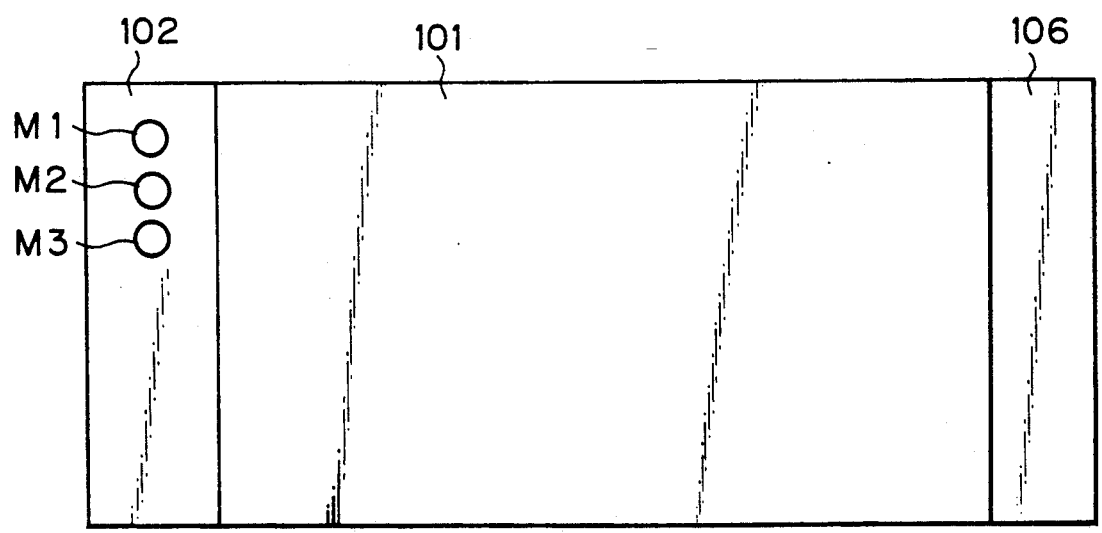

Referring to FIGS. 1A through 1C, a positive sheet assembly with which the embodiment is practicable is shown and generally designated by the reference numeral 100. As shown, the positive sheet assembly 100 has a positive sheet or image receiving sheet 101 and a black leader 102 adhered to the leading edge portion of the image receiving side of the sheet 101. A pod 103 accommodates a developer 103a therein and is adhered to the leader 102. A mask 104 is used to render image portions located at the edges of the image area (a×b, FIG. 1A) of the positive sheet 101 attractive. There are further provided on the positive sheet opposite side masks 105, a trap mask 106, and rail members 107 each being adhered to respective one of the side masks 105.

The developer 103a forced out of the pod 103 spreads uniformly over the entire surface of the positive sheet 101 in a thickness which is substantially the same as the thickness of the rail members 107 and side masks 105, as will be described specifically later.

The developer 103a is sealed in the pod 103 in more than an amount which suffices the formation of an image, so that it may spread up to the trailing edge of the image area. After the developer 103a has reached the trailing edge of the image area, excessive part thereof is collected between the trap mask 106 (labeled D in FIG. 1A) and a negative film 200 which will be described. This prevents the developer 103a from contaminating developing rollers, transport path and other components arranged in the apparatus.

The leader 102 has a code in the form of three marks M1, M2 and M3 for the identification of the kind of a positive sheet and so on. Specifically, the marks M1 to M3 may be a particular combination of punched holes or may be printed or otherwise provided on the leader 102 with a reflectance different from that of the leader 102. In the illustrative embodiment, the leader 102 is punched to form the marks M1 through M3. The pod 103 is adhered to the upper surface of he leader 102, as stated earlier. Hence, as shown in FIG. 1C, assuming that the marks M1, M2 and M3 are holes, the holes are concealed by the pod 103. Therefore, the leader 102 is colored in black in distinction from the color of the pod 103 (usually white) to enhance accurate sensing.

[II] Negative Film and Negative Film Cartridge

Figure 2A:
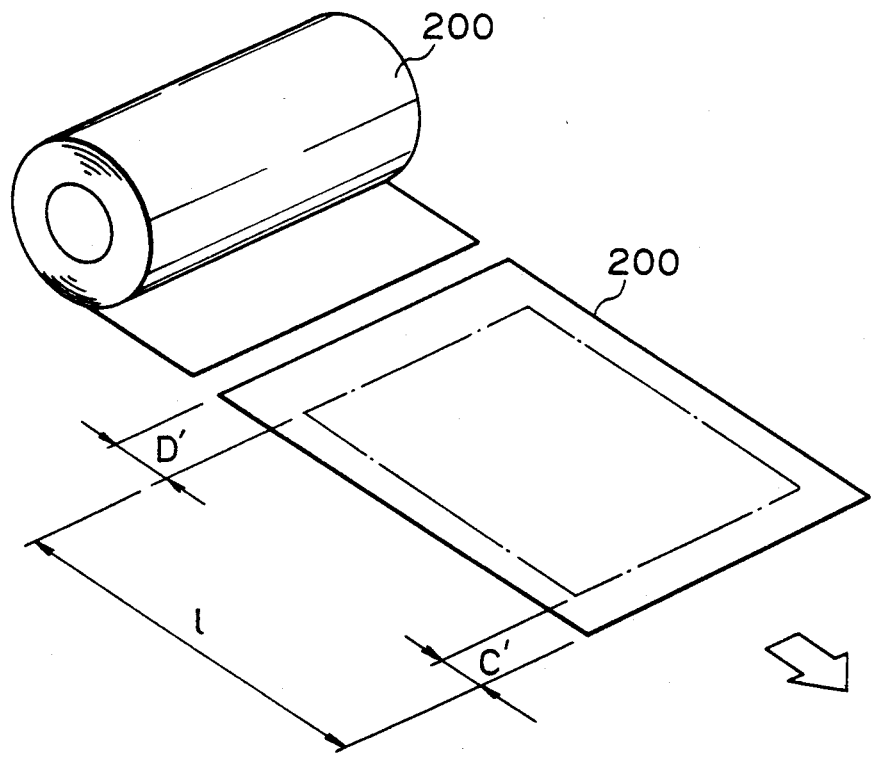
FIGS. 2A through 2C show a negative film applicable to the embodiment.
Figure 2B:
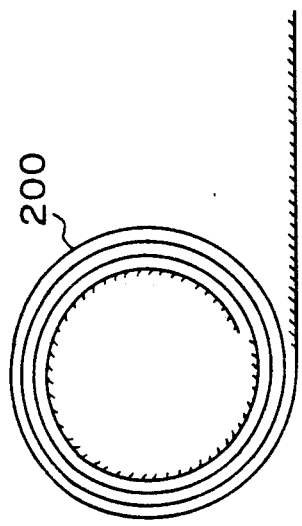
Figure 2C:
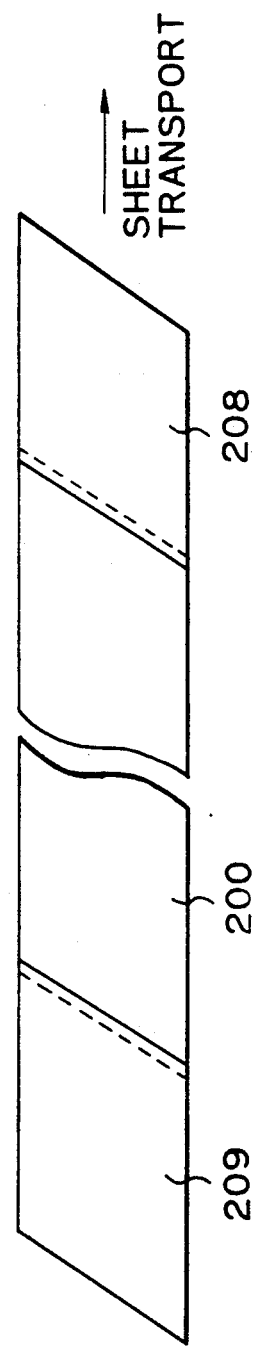
Figure 2D:
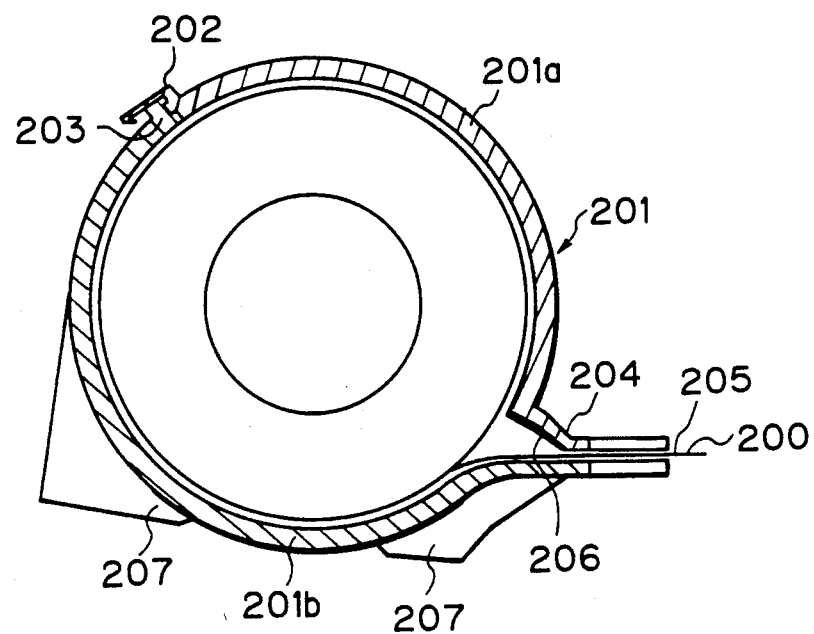
FIGS. 2D and 2E show a negative film cartridge included in the embodiment.
Figure 2E:
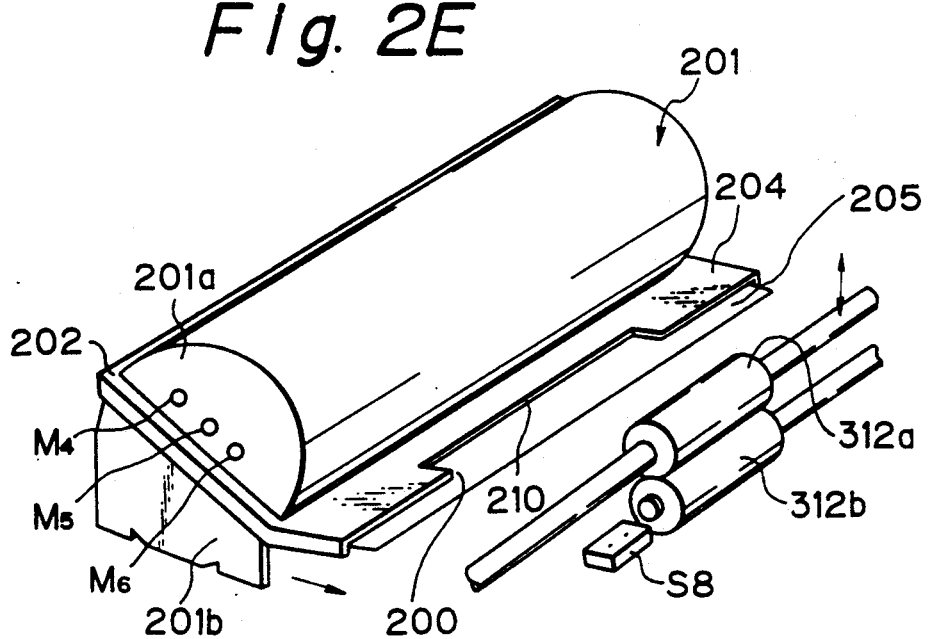

As shown in FIGS. 2A and 2B, the illustrative embodiment uses a negative film 200 in the form of a roll. The negative film 200 is implemented as photosensitive strip long enough to take, for example, thirty-six pictures. The film 200 is rolled up with the latent image forming surface, i.e. photosensitive surface thereof facing inward. As shown in FIG. 2D, the roll 200 is accommodated in a negative film cartridge 201. Specifically, the negative film cartridge 201 is implemented as a molding of resin which has a hollow cylindrical configuration for incorporating the roll 200. To facilitate the molding and the loading of the roll 200, the cartridge 201 is constituted by two parts which are separable in a plane which includes the axis of the cartridge 201. Namely, the cartridge 201 has an upper casing 201a and a lower casing 201b. As shown in FIGS. 2D and 2E, in the portions where the cartridge 201 is separable, there are provided locking portions 202 and 203, a guide portion 204 for guiding the negative film 200, and an outlet portion 205 for paying out the film 200 being guided by the guide portion 204. The locking portions 202 and 203 are configured such that the portion 202 covers the portion 203 to prevent external light from reaching the negative film 200. For the same purpose, an elastic member 206 is adhered to the inner surface of the guide portion 204 at one edge thereof and elastically held in contact with the negative film 200 at the other edge. The elastic member 206 may be implemented by Mylar to which a cloth with fur is adhered.

To load the negative film 200 in the cartridge 201, the roll 200 is set put in the lower casing 201b with the leading edge portion thereof paid out over several millimeters from the outlet portion 205. Then, the upper casing 201a is coupled with the lower casing 201b and then locked to the latter by the locking portions 202 and 203. If desired, the locking portions 202 and 203 may be replaced with screws or thermosensitive seals. Legs 207 extend out from the bottom of the lower casngg to surely hold the cartridge 201 in a predetermined position of the apparatus body. Marks M4, M5 and M6 are provided on one side of the upper casing 201a to indicate the kind of the negative film 200 and so on.

The negative film 200 is sensitive to light on the front surface thereof and intercepts light on the rear surface thereof. The film 200 is loaded in the cartridge 201 in a light room (semi-darkroom), as shown in FIG. 2B, so that the leading and trailing edge portions of the film 200 indicated by hatching in the figure are exposed. The other portion of the film 200 is not exposed so long as the roll 200 is tight. The exposed portions of the film 200 cannot form latent images and, therefore, simply wasted. This is undesirable considering the fact that the negative film 200 uses silver salt which is expensive. In the illustrative embodiment, as shown in FIG. 2C, the negative film 200 has a leading edge portion 208 and a trailing edge portion 209 each being implemented by a sheet which shields the rear surface of a negative film from light (inexpensive material). The leading and trailing edge portions 209 and 209 each has a length which is at least greater than the inner circumference of the cartridge 201. This not only prevents the leading and trailing edge portions of the film 200 from being exposed but also cuts down the cost of the film 200.

As shown in FIG. 2E, the guide portion 204 of the cartridge 201 has a notch 210 for receiving a pull-out roll pair 312 which pays out the negative film 200. When the cartridge 201 is mounted on the apparatus body, the pull-out roller pair 312 will surely nip the film 200.

[III] General Construction and Operation

Referring to FIG. 3, the instant photographic apparatus of the type using a peel-apart type film is shown and generally made up of an optical unit 301 and a transport unit 302. The optical unit 301 illuminates a document while moving the document and focuses a reflection from the document to a predetermined position (exposing surface). The transport unit 302 transports the negative film 200 to be predetermined position and, after exposure, brings it into register with the positive sheet assembly 100. In this condition, the developer is caused to spread between the negative film 200 and the positive sheet assembly 100 to transfer an image to the latter.

The optical unit 301 has a glass platen 303, a first carriage 304 loaded with a first mirror and a light source, a second carriage 305 loaded with a second and a third mirror, a third carriage 307 loaded with a lens 306 and a fourth and a fifth mirror, and a sixth mirror 308. The light source on the first carriage 304 comprises of a fluorescent lamp which will be described, and it illuminates a document laid face down on the glass platen 303 in parallel with the glass platen 303. The second carriage 305 is driven in the same direction as and at half the speed of the first carriage 304, whereby the length of the optical path remains constant. The lens 306 and third carriage 307 are movable to change the magnification and to adjust the conjugate length. The reflection from the document is routed through the first, second and third mirrors, the lens 306, and then the fourth to sixth mirrors to reach an exposing position A.

The transport unit 302 has a pay-out section for paying out the negative film or roll 200, a cutter section for cutting the film 200, a transport and exposure section for transporting and exposing the film 200, a transport section for transporting the positive sheet assembly 100, and a developing section.

The negative film 200 accommodated in the cartridge 201 is paid out by the pull-out roller pair 312a and 312b and transported onto a guide plate 314 via a gap defined between a rotary edge 313a and a stationary edge 313b and further to an intermediate roller pair 315a and 315b. When a sensor S1 located at the exposing position A senses the leading edge of the negative film 200 (or a predetermined time later), the carriages 304 and 305 start scanning the document. After the negative film 200 has been nipped by the intermediate roller pair 315a and 315b, it is exposed at the position A to form a latent image thereon. At this instant, assuming that the negative film 200 is driven at a speed $V_n$, the carriage 304 moves at a speed $V_1$, and the magnification is m, the speed $V_n$ of the film is controlled to satisfy an equation:

$$V_1 = V_n \times 1/m$$

The exposing position A is implemented as a flat surface over the entire slit zone and is located at the same level or at a higher level than the nipping level of the pull-out roller pair 312a and 312b and intermediate roller pair 315a and 315b. The intermediate roller pair 315a and 315b and the pull-out rollers 312a and 312b are driven at substantially the same peripheral speed. On the elaspse of a predetermined period of time after the sensor S1 has sensed the negative film 200, i.e., just after the film 200 has been nipped by the roller pair 315a and 315b or when exposure begins, the rollers 312a and 312b stop rotating and become free with an adequate load acting thereon. This allows the negative film 200 to be transported in close contact with the guide plate 314 while being slightly pulled at the exposing position A. This is successful in maintaining the length of the optical path terminating at the negative film 200 and the transport speed constant.

The negative film 200 exposed over a predetermined length is once brought to a stop. Then, the rotary edge 313a is rotated in contact with the stationary edge 313b to cut the negative film 200. Specifically, the film 200 is brought to a stop when a predetermined time t expires after the sensor S1 has sensed the film 200. It follows that the trailing edge portion of the cut length of film 200, or sheet, is not exposed. More specifically, the film 200 is not used at all, i.e., used simply wastefully over a length greater than the distance G between the exposing position A and the tip of the stationary edge 313b. In the illustrative embodiment, the exposing position A and the cutter (edges 313a and 313b) are so arranged as to make the distance G shorter than the distance D', FIG. 2A, between the trailing edge of the positive sheet assembly 100 and the that of an image to be transferred to the positive sheet 101. This reduces the area of the negative film 200 which is left unused. Likewise, the leading edge portion of the cut sheet 200 is not used over a length corresponding to at least the distance H between the exposing position A and the intermediate roller pair 315a and 315b. The illustrative embodiment arranges the exposing position A and intermediate roller pair 315a and 315b in such a manner as to make the distance H shorter than the distance C', FIG. 2A, between the leading edge of the film 200 and the leading edge of the latent image to be formed on the film 200, thereby reducing the wasteful consumption of the film 200.

Cutting the negative film 200 after it has been fully exposed is desirable since cutting the film 200 while it is in exposure, for example, would change the transport speed due to the resultant shock.

The cut length of the negative film 200, or sheet, is turned over about 180 degrees by a roller pair 316a and 316b and a guide 317 and then guided by guides 318a and 318b toward a roller 320. The roller 320 drives the sheet 200 until the leading edge of the sheet 200 abuts against a roller pair 321 (not moving at this stage of operation).

On the other hand, the positive sheet assembly 100 begins to be transported before the negative film 200 is transported, exposed and cut, as follows. The positive sheet assembly 100 is not photosensitive and, therefore, can be inserted into the apparatus from the outside. In the embodiment, positive sheet assemblies 100 are manually inserted one after another along a guide 311 which is located at the right lower position of the apparatus. This eliminates the need for a sheet feed and separating mechanism, sheet cassettes and others which would make the apparatus bulky and expensive.

The positive sheet assembly 100 is inserted into the apparatus along the guide 311 and opposite side guides, not shown. As soon as a sensor S5 senses the leading edge of the assembly 100, an inlet roller pair 322 starts rotating. The rollers of the roller pair 322 are so configured and arranged as to nip only the opposite sides of the assembly 10, i.e., not to smash the pod 103 adhered to the leading edge of the assembly 100. The positive sheet assembly 100 is driven by the inlet roller pair 322 through a path defined between guides 323a and 323b and then brought to a stop. Specifically, the assembly 100 is brought to a stop on the elapse of a time t' as counted from the time when the sensor S6 sensed the leading edge of the assembly 100. As illustrated in the figure, the transport path assigned to the assembly 100 is bent at at least one point to intercept external light which would otherwise enter the apparatus to expose the negative film 200. The positive sheet assembly 100 stopped in the apparatus as mentioned above waits for a printing operation.

When a print switch provided on the apparatus is pressed, the negative film 200 is transported, exposed and cut, as stated earlier. The negative film or sheet 200 abutted against the roller pair 321 which is not rotating is bent a predetermined amount between the guides 319 and 318b by the force of the roller pair 320. Thereafter, the roller pair 321 is driven to move the negative sheet 200 to a path defined between guides 324a and 324b. The roller pair 321 starts rotating on the elapse of a predetermined time after the sensor S3 has sensed the leading edge of the negative sheet 200. As the negative sheet 200 is deformed in the above-described manner, the leading edge thereof accurately follows the nip of the roller pair 321 and is thereby freed from skew. A sensor S4 senses the leading edge of the negative sheet 200 being driven by the roller pair 321.

Thereafter, the negative sheet 200 is transported to the nip of developing rollers 325a and 325b. At a predetermined time after the sensor S4 has sensed the negative sheet 200, the inlet roller pair 322 is rotated to cause the positive sheet assembly 100 to abut against the developing rollers 325a and 325b which are not rotating and thereby corrects the skew of the assembly 100. Thereupon, the developing rollers 325a and 325b start rotating.

After the developing rollers 325a and 325b have driven the positive sheet assembly 100, the roller pair 321 drives the negative sheet 200 until the leading edge of the sheet 200 reaches the nip of the developing rollers 325a and 325b. Then, both the positive sheet assembly 100 and the negative sheet 200 are transported at the peripheral speed of the developing rollers 325a and 325b. While the leading edges of the positive sheet assembly 100 and negative sheet 200 are deviated by an amount J, the embodiment controls the deviation J to be at least smaller than the amount C, FIG. 1A. As a result, the negative film 200 is cut at a length shorter by the amount J than when the negative sheet 200 and the positive sheet assembly 100 are transported with their leading edges held in register each other.

Figure 4A:
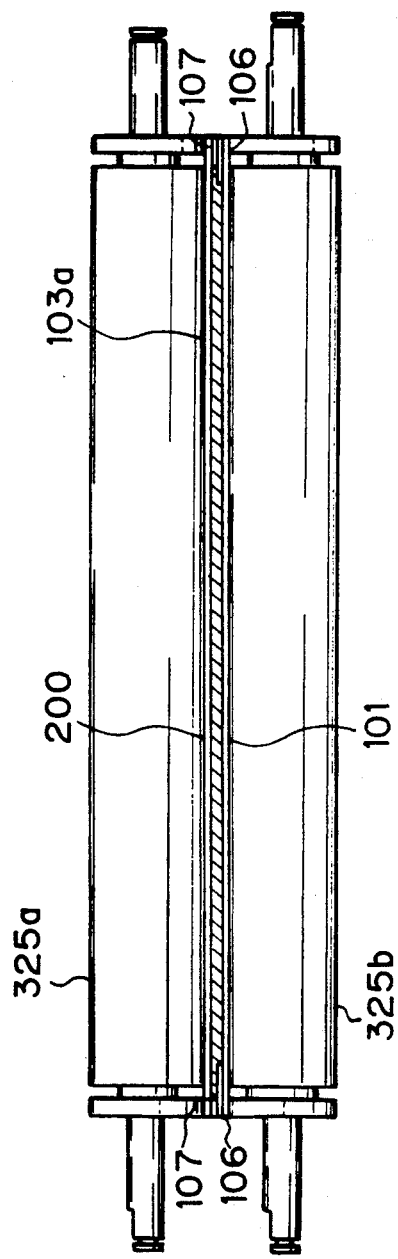
FIGS. 4A through 4C and FIGS. 5A through 5G show the construction and operation of a developing section included in the apparatus.
Figure 4B:
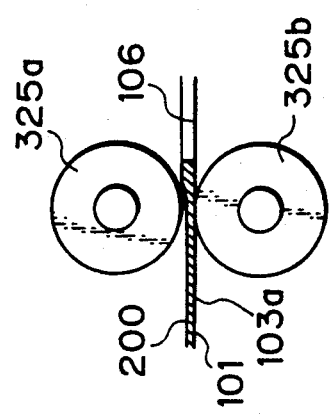
Figure 4C:
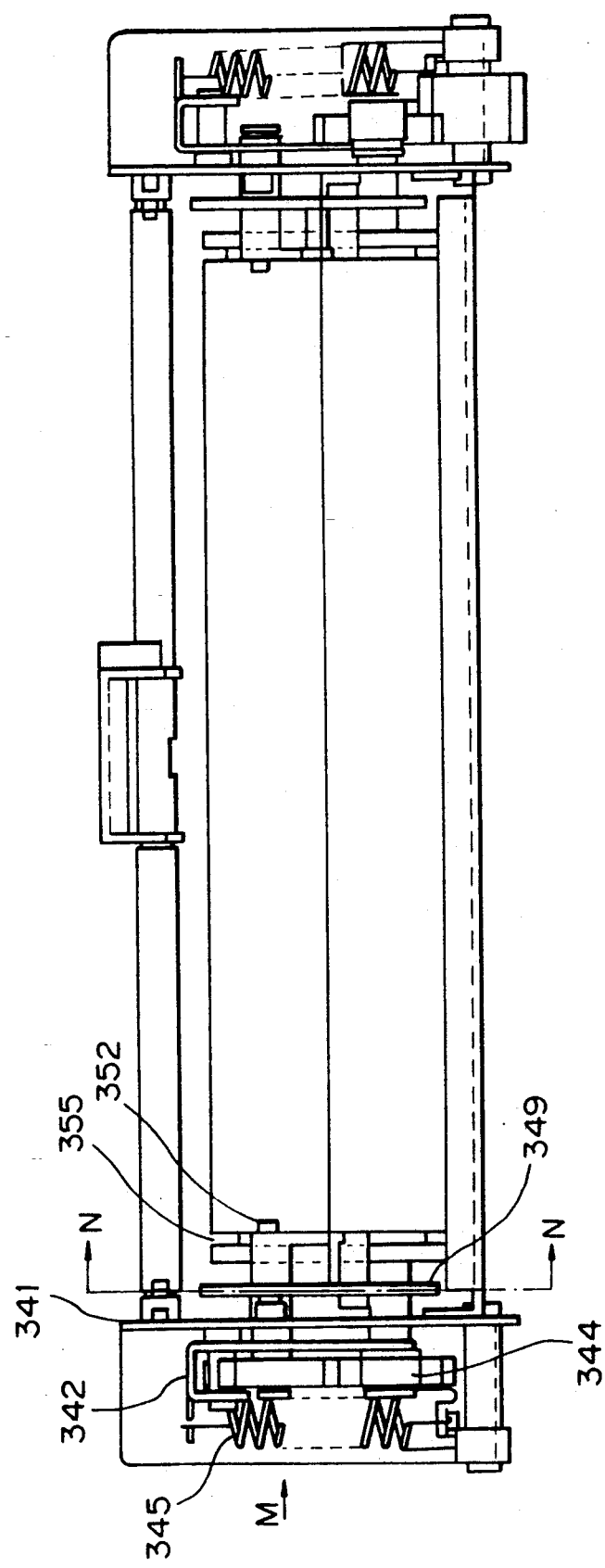

Referring to FIGS. 4A through 4C, the developing section including the developing rollers 325a and 325b will be described. As shown, the developing roller 325a is journalled to levers 342 which are rotatably mounted on a shaft 343 which is in turn fixed to opposite side walls 341. Hence, the developing roller 325a rotatably mounted on the side walls 341. As shown in FIGS. 4C, 5C and 5D, the developing section includes members 349 and 350 which prevent the developer 103a from being forced out from opposite sides of the negative sheet 200 and positive sheet assembly 100 to smear the developing rollers 325a and 325b, transport path, etc. Specifically, the members 349 each is rotatable about a pin 352 which is studded on the associated side wall 341, while the members 350 each is fixed to the side wall 341. Both of these members 349 and 350 are received in channels 355 which are formed in the developing rollers 325a and 325b.

Figure 5A:
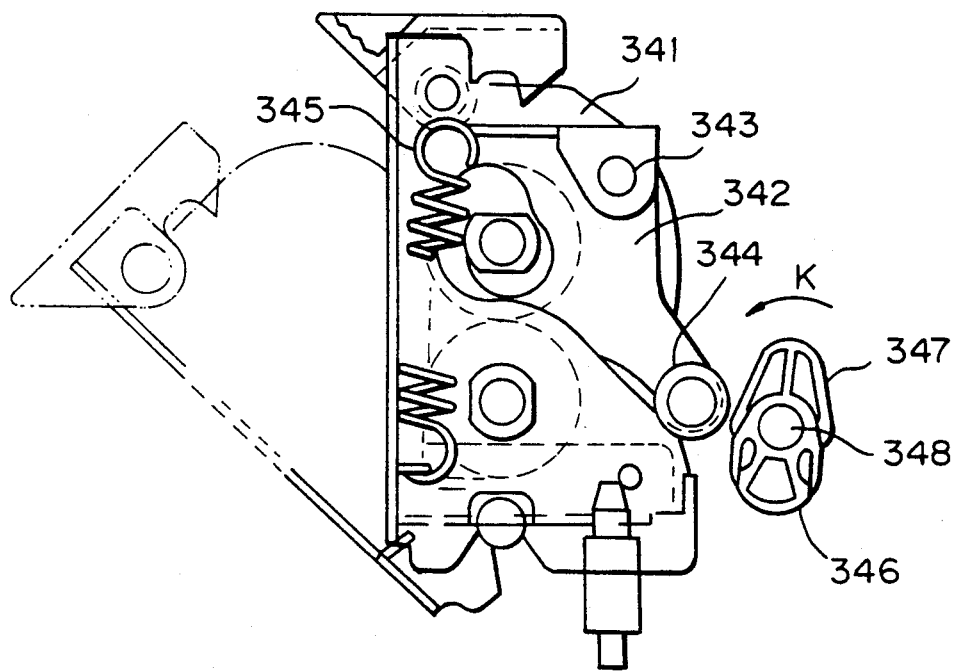
Figure 5B:
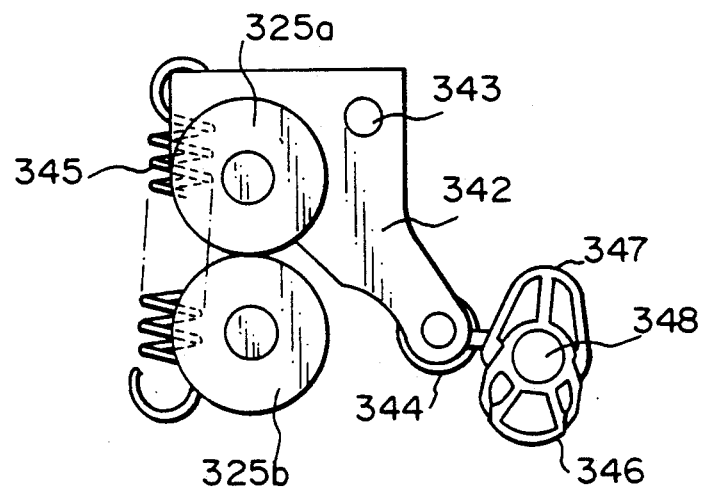
Figure 5C:
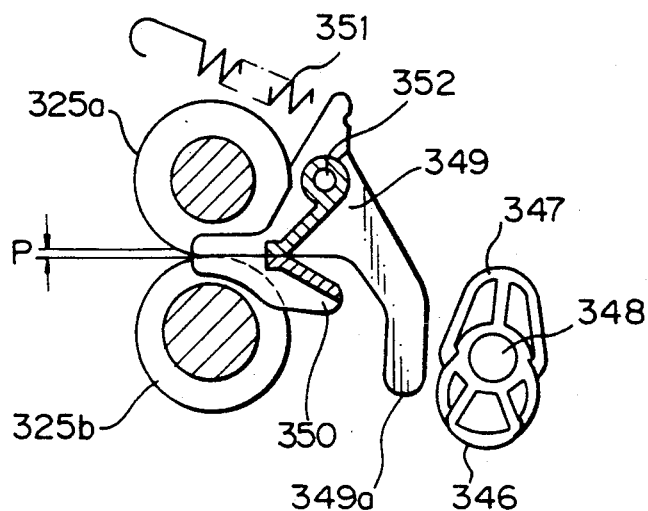
Figure 5D:
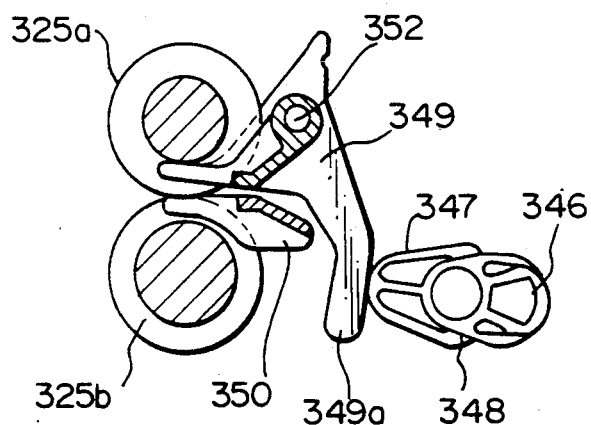

When the apparatus body is in a stand-by condition, the developing section is held in the position shown in FIGS. 5A through 5C. As shown, cams 346 and 347 are mounted a cam shaft 348 which is journalled to opposite side panels of the apparatus body. The cam 346 moves the developing rollers 325a and 325b away from each other while the cam 347 moves the member 349 away from the member 350, as will be described. In the above-mentioned stand-by condition, both of the cams 346 and 347 are spaced apart from a cam follower 344 journalled to a lever 342 and a lever portion 349a forming part of the member 349. The developing roller 325a is pressed against the developing roller 325b by a spring 345. The member 349 is pressed by a spring 351. As shown in FIG. 5C, the member 349 in the pressed condition defines a gap P between itself and the member 350. The cam shaft 348 to which the cams 346 and 347 are fixed is rotated by each ¼ rotation by a spring clutch, not shown. A sensor, not shown, senses the position of the cams 346 and 347. If the cams 346 and 347 are not held in the stand-by position as sensed by the sensor, they are moved to such a position.

When the sensor S5 senses the positive sheet assembly 100 being inserted along the guide 311, FIG. 3, the cam shaft 348 is rotated counterclockwise (arrow K) by ¼ rotation to reach the position shown in FIG. 5D. Then, the cam 347 urges the lever portion 349a and thereby moves the member 349 away from the member 350. In this condition, the positive sheet assembly 100 is allowed to surely reach the nip of the developing rollers 325a and 325b without being intercepted by the member 349.

Figure 5E:
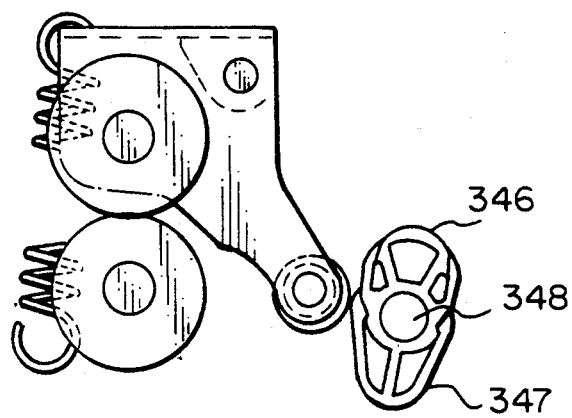
Figure 5F:
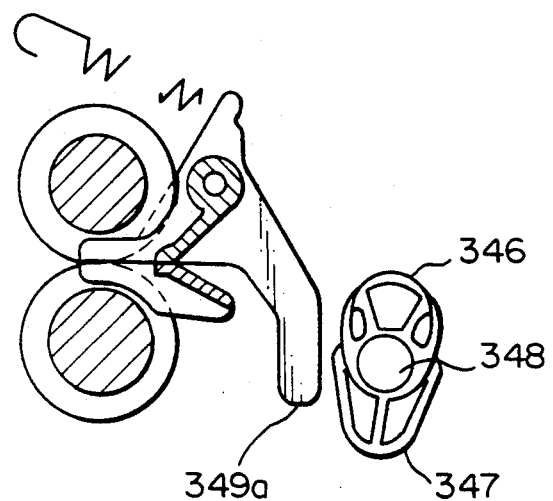

Thereafter, the negative film or sheet 200 is transported, as previously stated. As the developing rollers 325a and 325b are rotated, they insert the negative sheet 20 into the gap between the members 349 and 350. On the elapse of a predetermined period of time, the cam 348 is rotated by another ¼ rotation to the position shown in FIGS. 5E and 5F. In the resulted position, the member 349 is spaced apart from the member 350 by the same gap P as in FIG. 5C (a position for preventing the developer from being forced out). This is effected by counting the time after the sensor S4 has sensed the leading edge of the negative sheet 200.

Figure 5G:
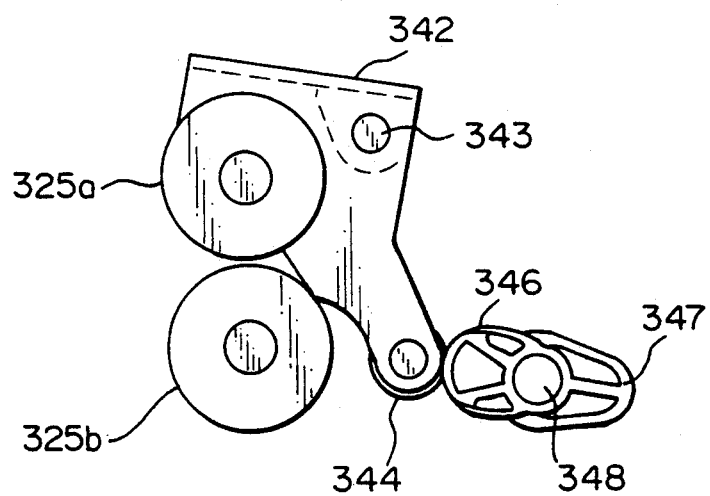

After the developing rollers 325a and 325b have spread the developer 103a in the previously described manner, the cam shaft 348 is rotated by another ¼ rotation to the position shown in FIG. 5G. As a result, the cam 346 and the cam follower 344 contact each other. In this condition, the developing rollers 325a is moved away from the developing roller 325a to define a gap which is necessary for excessive part of the developer 103a to be collected. The negative sheet 200 and positive sheet assembly 100 are driven out into a dark box with the developer 103a being sequentially spread by the rollers 325a and 325b. The dark box is one of essential features of the present invention and has a tray 326 and a lid 327, as will be described specifically later.

After the developer 103a has been fully spread, a timer starts counting a fixing time (about 30 seconds to 40 seconds). In the meantime, an indication for inhibiting the operator from opening the lid 327 of the dark box is displayed. On the elapse of the fixing time, an indication for allowing the operator to remove the joined negative sheet 200 and positive sheet assembly 100 from the dark box. When the joined sheets 200 and 100 are removed from the dark box, a sensor S7 senses the trailing edge of the joined sheets 100 and 200 and causes the cam shaft 348 to rotate a ¼ rotation in the counterclockwise direction to the stand-by position shown in FIGS. 5A through 5C. While the developing rollers 325a and 325b are spaced apart from each other, i.e., until the sensor S7 senses the trailing edge of the joined sheets 200 and 100, a printing operation is inhibited. This prevents the operator from forgetting to remove the joined sheets 200 and 100 from the dark box.

After the development, the operator peels the positive sheet 101 from the negative sheet 200 to obtain an image. The leader 102, masks 104, side masks 105 and trap mask 106, FIGS. 1A through 1C, are removably adhered to the positive sheet 101. Hence, these components on the positive sheet 101 stick to the negative film 200 by the adhesive force of the developer 103a. As a result, when the positive sheet 101 is removed from the joined sheet the above-mentioned components on the positive sheet 101 are readily removed.

as shown in FIG. 1A, the pod 103 provided on the positive sheet assembly has a widthwise dimension L which is the same or shorter than the width b of the image area, so that it may not be smashed by rollers or other members arranged on the transport path. Therefore, some distance (E) is needed for the developer 103a to spread over the image area after the pod 103 has been opened at a portion F. The previously mentioned deviation J between the negative film 200 and the positive sheet assembly 100 is achievable if the distance E is selected to be shorter than the distance C between the leading edge of the assembly 100 and the portion F of the pod 103. It follows that the distance C' between the leading edge of the negative sheet 200 and the leading edge of the latent image shown in FIG. 2A should only be selected to be longer than the distance E between the portion F of the pod 103 and the leading edge of the image forming area.

[IV] Dark Box (Essential Feature of the Invention)

Figure 6A:
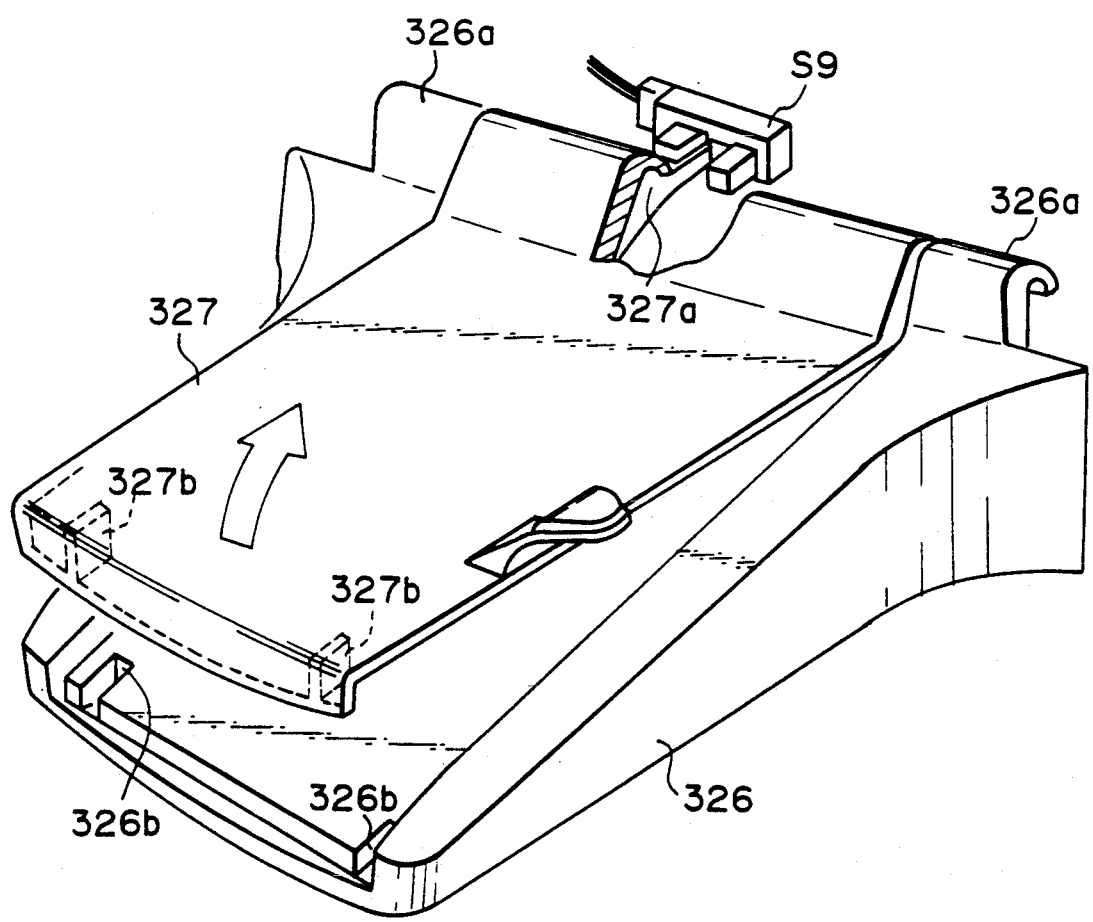
FIGS. 6A through 6D show a dark box included in an instant photographic apparatus in accordance with the present invention.

Referring to FIGS. 6A through 6D, the dark box included in the embodiment will be described. As shown in FIG. 6A, the dark box has the tray 326 and the lid 327 which is rotatably and removably mounted on a shaft 328 which is mounted on the tray 326. While the lid 327 is closed, the dark box receives the joined sheets 100 and 200 into the space defined by the lid 327 and tray 326. This space is shielded from external light and, in this sense, plays the role of a darkroom. Assuming that the positive sheet 101 is a transparent sheet for OHP or a paper-like thin sheet, then the negative sheet 200 will be exposed by light transmitted through the positive sheet 101 during the interval between the spread of the developer and the fixation of the latent image on the negative film 200. The lid 327 prevents the negative sheet 200 from being exposed by such light.

The lid 327 is rotatable about and removable from the shaft 328 which is affixed to the tray 326, as stated above. Hence, the operator can easily remove the joined sheets 100 and 200 from the dark box by opening the lid 327, as indicated by an arrow in FIG. 6A. Further, by removing the lid 327, the operator can clean the inner periphery of the tray 326.

Figure 6B:
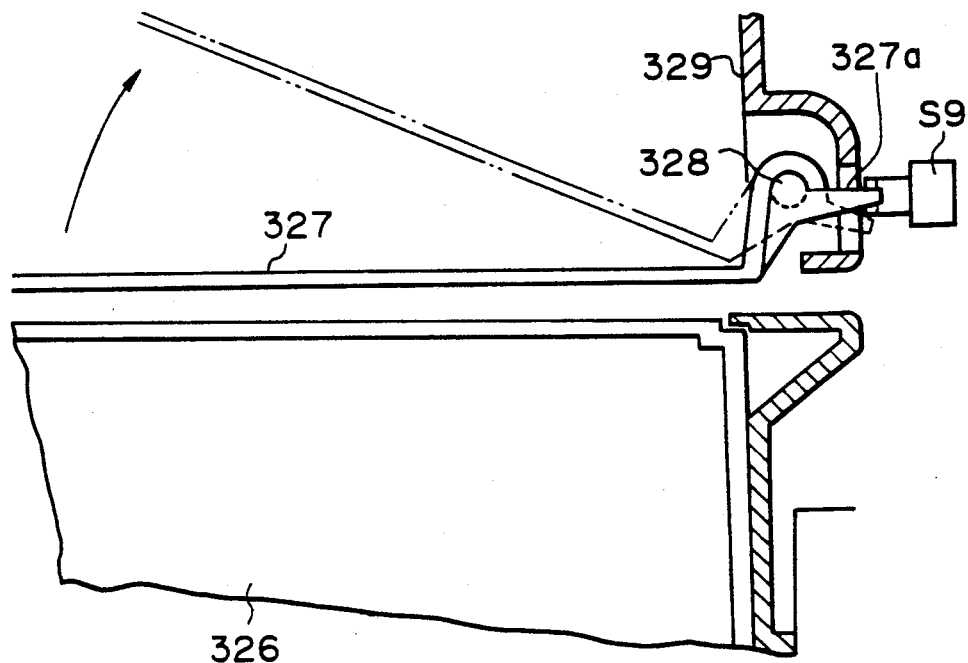

The tray 326 is rotatably and removably connected by hinges 326a to a shaft, not shown, which is in turn mounted on the apparatus body coaxially with the shaft 328. When the apparatus body is transported or when a cover 329 should be opened to replace the negative film cartridge 201, for example, the tray 326 can be removed with ease so as not to interfere with such an operation. As shown in FIGS. 6A and 6B, a light intercepting piece 327a is provided on the lid 327 such that when the lid 327 is closed as indicated by a solid line in FIG. 6B, the piece 327a turns on a sensor S9 which is mounted on the cover 329. The intecepting piece 327a and sensor S9, therefore, detect a condition wherein the lid 327 is closed and mounted on the tray 326. Stated another way, when the sensor S9 is in an OFF state, it shows that the lid 327 is open or not mounted on the tray 326. While the sensor S9 is implemented by a photointerrupter, it may be replaced with a microswitch, a proximity switch or any other similar sensor.

The sensor S9 determines not only whether or not the lid 327 is open and whether or not it is present but also whether or not the tray 326 is present. This reduces the required number of sensors and thereby the cost while simplifying the construction. Of course, a sensor responsive to the tray 326 may be mounted on the apparatus body, if desired.

Figure 6C:
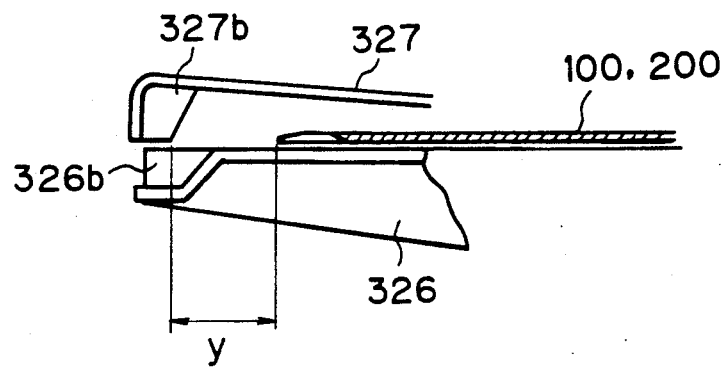
Figure 6D:
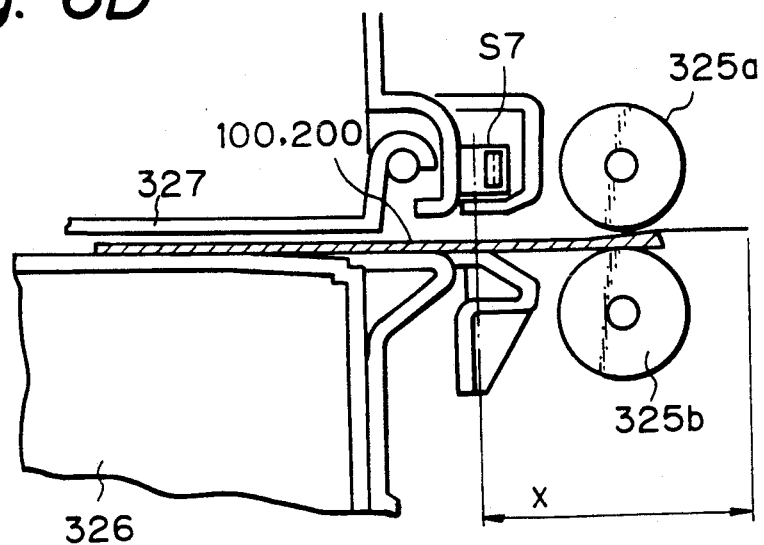

As shown in FIGS. 6A and 6C, the lid 327 has projections 327b while the tray 326 has recesses 326b which are positioned to mate with the projections 327b. When the trailing edge of the joined sheets 100 and 200 has moved away at least from the sensor S7, the sheets 100 and 20 abut against the lugs 327b to maintain the lid 327 in an open state. Then, the sensor S9 senses such an open position of the lid 327. More specifically, the sensor S9 determines that the lid 327 is open until the joined sheets 100 and 200 are fully removed from the tray 326, inhibiting the next printing operation. The projections 327b are located outside of the width b of the image area, FIG. 1A, so as not to distrub the image when the laminate abuts thereagainst. As shown in FIG. 6C, the projections 327b are positioned downstream of the leading edge of the joined sheets 100 and 200 being developed with respect to the intended direction of transport. The distance y between the projections 327b and the leading edge of the sheets 100 and 200 should only be shorter than the distance x between the trailing edge of the sheets and the sensing position, as shown in FIG. 6D.

A control section 400 which will be described inhibits the printing operation in response to the outputs of the sensors S7 and S9.

Figure 6E:
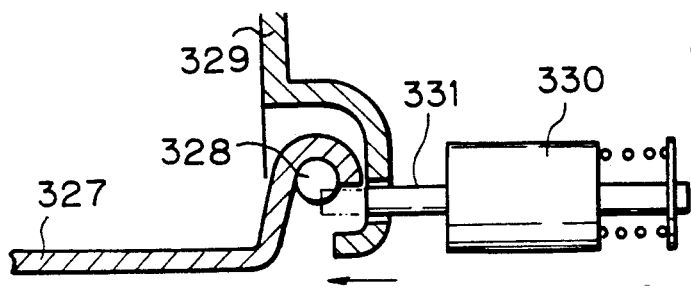
FIGS. 6E and 6F show another specific implementation for opening and closing the dark box.
Figure 6F:
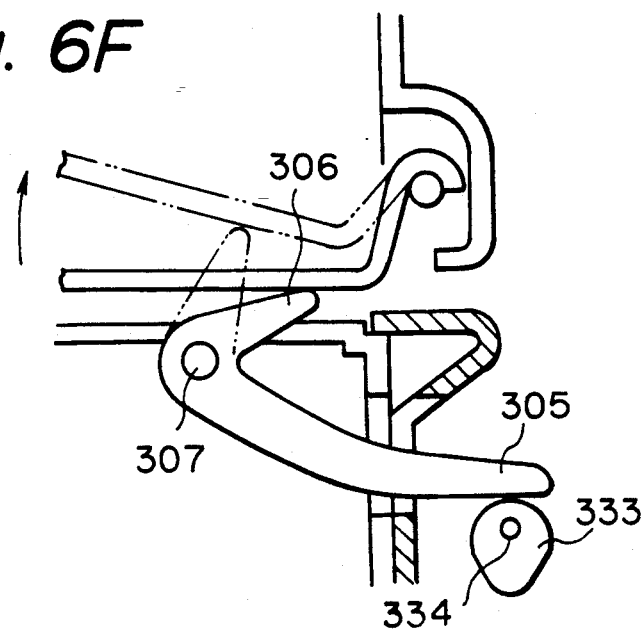

The illustrative embodiment has the freely openable lid 327 in order to simplify the construction. Alternatively, as shown in FIG. 6E, a solenoid 330 may be used to prevent the lid 327 from being opened. Specfically, the solenoid 330 is continuously energized for a given period of time long enough to cause the joined sheets 100 and 200 to loose sensitivity to light, moving a plunger 301 thereof in a direction indicated by an arrow. In this condition, the plunger 301 abuts against the lid 327 to prevent it from being opened. Further, as shown in FIG. 6F, an arrangement may be made such that the lid 327 is automatically opened on the elapse of a given period of time in which the joined sheets 100 and 200 will not be susceptible to light. Specifically, in FIG. 6F, a cam 333 is driven by a drive means, not shown, to rotate about a shaft 334. When the cam 333 rotates a predetermined angle (½ rotation), it abuts against and raises a lever 305 which is free to rotate on a shaft 307. As a result, a lever 306 formed integrally with the lever 305 abuts against the lid 327 to raise the lid 327 open. If desired, a worm wheel is mounted on the shaft on which the lid 327 is rotatble . Then, a motor mounted on the projection 327b will open the lid 327 via a worm gear. In this case, the lid 327 cannot be opened unless use is made of a motor.

[V] Circuitry

Figure 7:
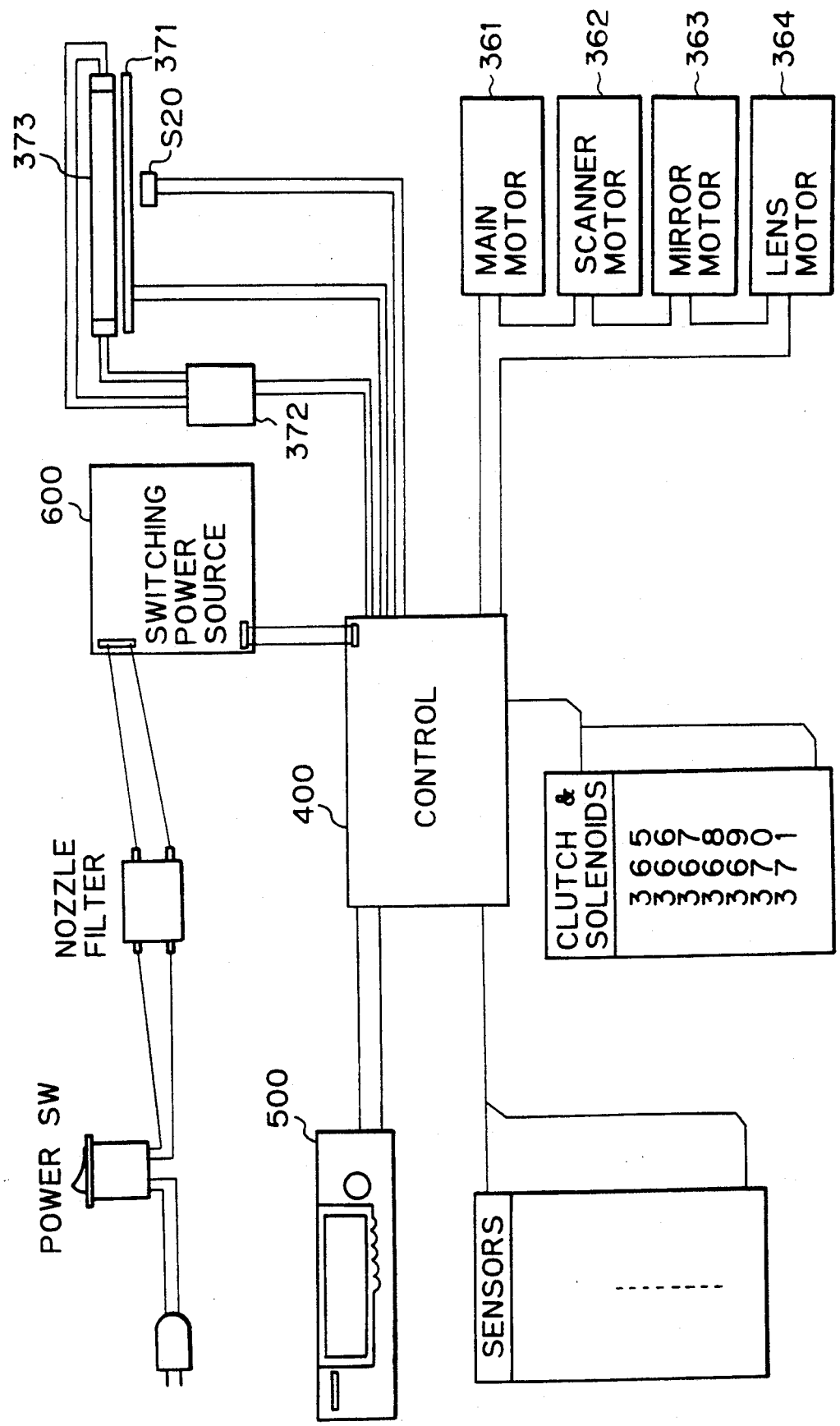
FIG. 7 is a block diagram schematically showing an instant photographic apparatus in accordance with the present invention.

Referring to FIG. 7, the control section 400 is connected to an operation and display panel 500 which displays messages and has various keys thereon, a switching power source 600 for feeding power to the apparatus body, a fluorescent lamp (light source of the embodiment) 373, a lamp stabilizer 372 for stabilizing the output of the lamp 373, a sensor S20 responsive to the quantity of light issuing from the lamp 373, a main motor 361 for effecting the transport of the negative film 200 and driving various rollers, a scanner motor 362 for driving the scanner, a mirror motor 363 for driving the mirrors in the event of magnification change, a lens motor 364 for moving the lens at the time of magnification change, clutches 365 through 370 (which will be described), a solenoid 371 (which will be described), and sensors S1 through S22 (except for the sensor S20).

[VI] Role and Layout of Drive System

Figure 8:
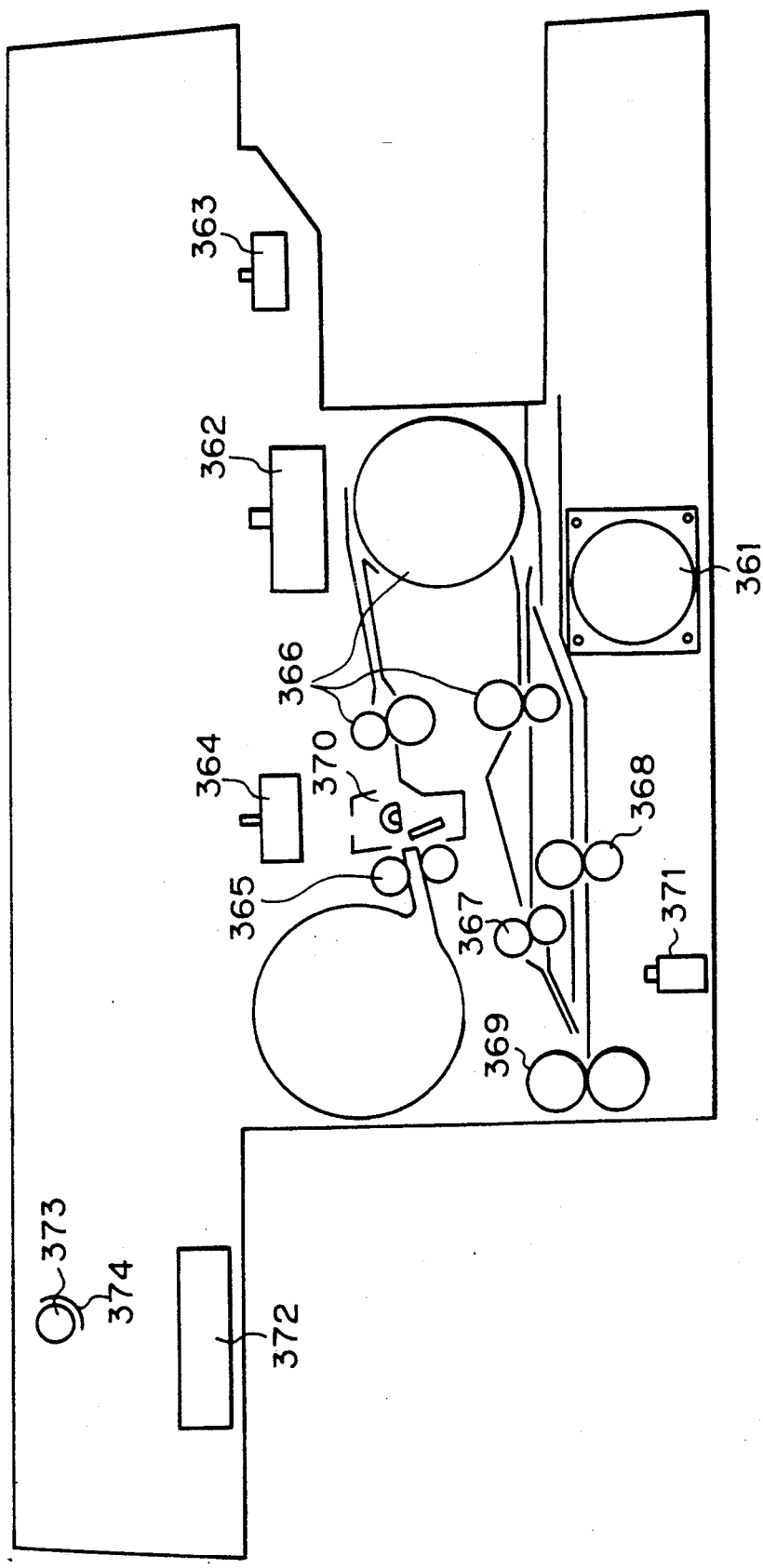
FIG. 8 shows a specific layout of a drive system including a motor, clutches, and a solenoid.

FIG. 8 shows the layout of the drive system including such motors, clutches, and solenoid. As shown, a pull-out clutch 365 is associated with the pull-out roller pair 312a and 312b to drive this roller pair. A negative feed clutch 366 drives the intermediate roller pair 315a and 315b, roller pair 316a and 316b, and roller pair 320. A register clutch 357 drives the register roller 321. A positive feed clutch 368 drives the inlet roller pair 322. A developing roller clutch 369 drives the developing rollers 325a and 325b. A cutter clutch 370 drives the rotary edge 313a. A developing solenoid 371 switches over the operating mode of the developing rollers 325a and 325b.

[VII] Roles and Layout Sensors

Figure 9:
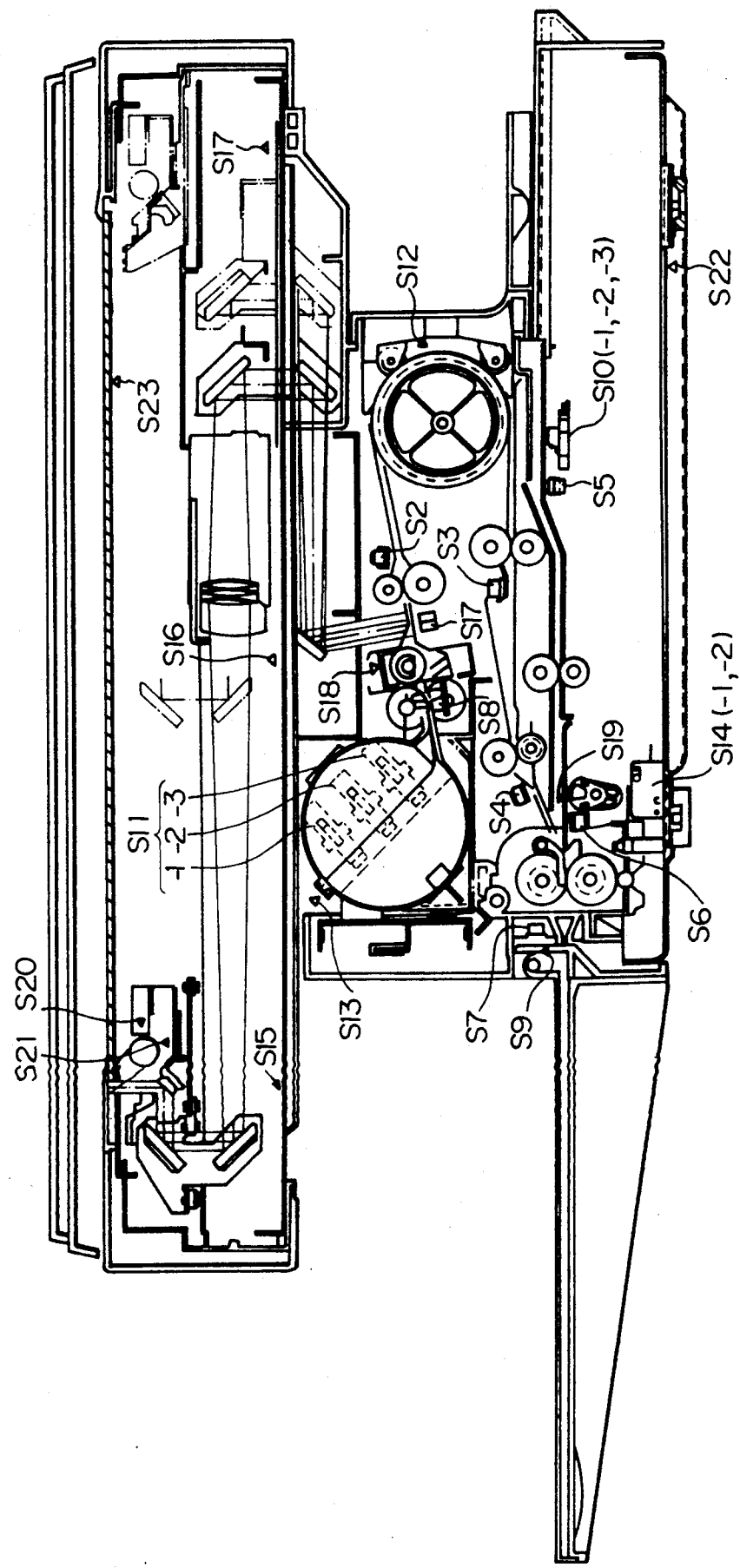
FIG. 9 shows the roles and layout of sensors arranged in an instant photographic apparatus in accordance with the present invention

Referring to FIG. 9, the sensor S1 is located on the negative transport path upstream of the cutter in order to sense the leading edge of the negative film. The output of the sensor S1 determines a timing for the scanner to start scanning a document. Specifically, the sensor S1 is implemented as an infrared-ray reflection type sensor. The sensor 2 is responsive to a jam caused by the negative film 200 on the negative film transport path. A jam is determined on the basis of the interval between the time when the sensor S1 senses the leading edge and the time when the sensor S2 senses it. The sensor S2 is also implemented as an infrared-ray reflection type sensor. The sensor S3 is identical in function with the sensor S2; a jam is determined on the basis of the interval between the time when the sensor S2 senses the leading edge of the negative film 200 and the time when the sensor S3 senses it. The sensor S3 is comprised of an infrared-ray reflection type sensor. The sensor S4 is located upstream of the developing rollers 325a and 325b and causes the rollers 325a and 325b to rotate at a predetermined time after it has sensed the negative film 200. Also, the sensor S4 senses the trailing edge of the negative film 200 to determine a time when the developing roller 325a should be moved away from the developing roller 325a. Further, the sensor S4 determine whether or not a jam has occurred on the basis of the interval between the time when the register roller 321 begins rotating and the time when the sensor S4 senses the negative film 200. This sensor S4 is implemented by an infrared-ray reflection type sensor, too.

The sensor S5 is responsive to the insertion of the position sheet assembly 100. The sensor S5 is positioned such that when it senses the leading edge of the assembly 100, the marks M1, M2 and M3 of the assembly 100 has reached an identification (ID) code sensor (sensor S10). The sensor S5 is comprised of an infrared-ray reflection type sensor. The sensor S6 is responsive to the positive sheet assembly 100 about to reach the developing rollers 325a and 325b. Specifically, when the positive sheet assembly 100 is inserted and transported toward the developing rollers 325a and 325b, the sensor S6 allows the assembly 100 to be brought to a stop in abutment against the rollers 325a and 325b. This sensor S6 is implemented by an infrared-ray reflection type sensor.

The sensor S7 determines whether or not the joined sheets 100 and 200 exist on the discharge tray 326 and is comprised of an infrared-ray reflection type sensor. The sensor S8 determines whether or not the negative film 200 is present by sensing the rear surface of the latter. At the same time, the sensor S8 senses the leading edge and trailing edge of the negative film 200 (shielding sheets 208 and 209) and is comprised of an infrared-ray reflection type sensor; a phototransistor to which a reflection is incident delivers its output to an analog-to-digital (AD) converter. The sensor S9 is responsive to the presence of the lid 328 and implemented by a photointerrupter. The sensor S10 reads the marks M1, M2 and M3 (ID code) provided on the positive sheet assembly 100. Specifically, the sensor S10 has three sensors S10-1, S10-2 and S10-3 matching in number with the marks M1, M2 and M3. The sensor S11 reads marks M4, M5 and M6 (ID code) provided on the side of the negative film cartridge 201. This sensor S11 also has three sensors S11-1, S11-2 and S11-3 matching in number with the marks M4, M5 and M6.

The sensor S12 is responsive to the position of a right door which is openable to remove a jamming sheet. The sensor S12 is comprised of a photointerrupter. The sensor S13 is responsive to the position of a left door which is openable to clean the developing rollers 325a and 325b or to set the negative film cartridge 201.

The sensors S14-1 and S14-2 determine whether or not the developing rollers 325a and 325b have been set and are implemented by microswitches. The sensor S15 is responsive to the home position of the scanner and constituted by a photointerrupter. The sensor S16 is responsive to the home position of the lens and also constituted by a photointerrupter. The sensor S17 is responsive to the home position of the magnification changing mirror and comprised of a photointerrupter. The sensor S18 is responsive to the home position of the cutter and implemented by a photointerrupter.

The sensor S19 determines whether or not the developing rollers 325a and 325b are held in their home position. The developing rollers 325a and 325b are operable in four different modes:
 (i) pressed, edge controller ON
 (ii) pressed, edge controller OFF
 (iii) pressed, edge controller ON
 (iv) released Among the above modes (i) through (iv), the mode (i) defines the home position which is set up on the turn-on of the power switch and in a stand-by condition.

The sensor S20 is constituted by a photodiode and an operational amplifier. The photodiode senses the intensity of light issuing from the lamp 373 while a current-to-voltage converting circuit and an amplifying circuit converts the output of the photodiode into a voltage signal. This voltage signal is applied to an AD converter and therefrom to a CPU. In response, the CPU controls the amount of light to issue from the lamp 373. The sensor S21 comprises a thermistor and senses the temperature of the lamp 373. Since the lamp 373 has a temperature characteristic in a spectral distribution, it has a limited operable temperature range. Therefore, the lamp 373 has to be heated by a heater 374. The sensor S21 senses the temperature of the lamp 373 to allow the heater 374 to be ON/OFF controlled. The sensor S22 is responsive to the ambient temperature and comprised of a thermistor. The sensor S23 comprises a reed switch and senses a 35 millimeter projector when the projector is mounted on the glass platen 303. When the output of this sensor S23 indicates that such a projector is mounted on the glass platen 303, the instant photographic apparatus enters into a projection mode.

[VIII] Operation and Display Panel

Figure 10:
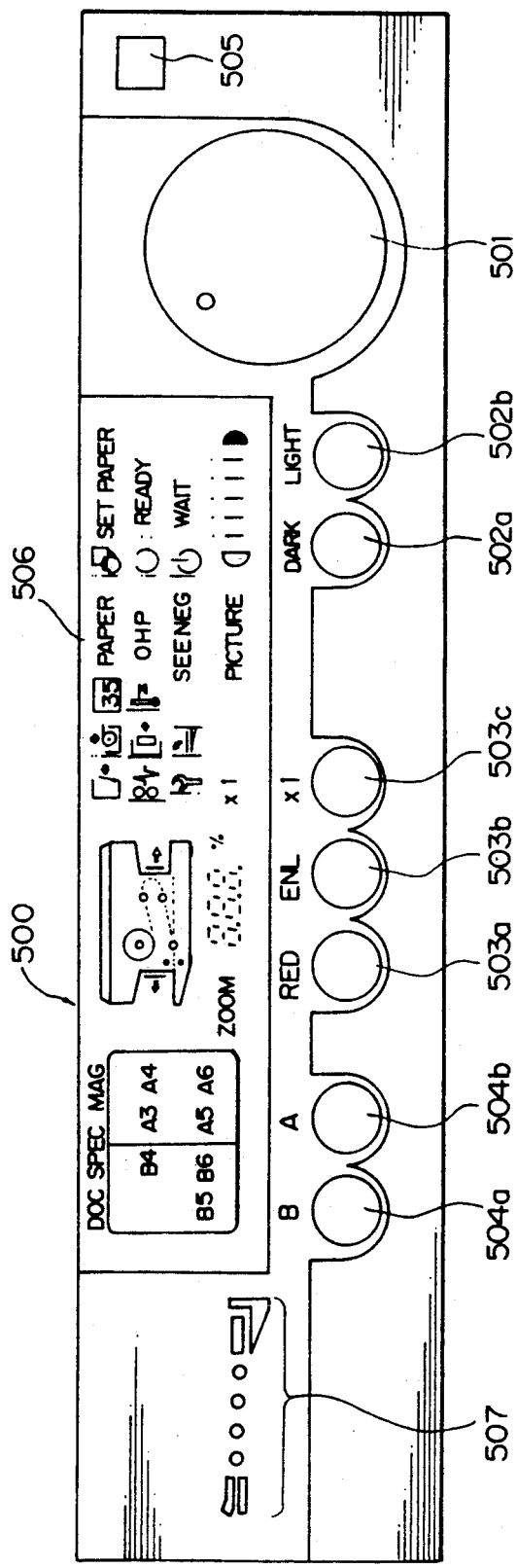
FIG. 10 shows a specific arrangement of an operation and display panel.
Figure 11:
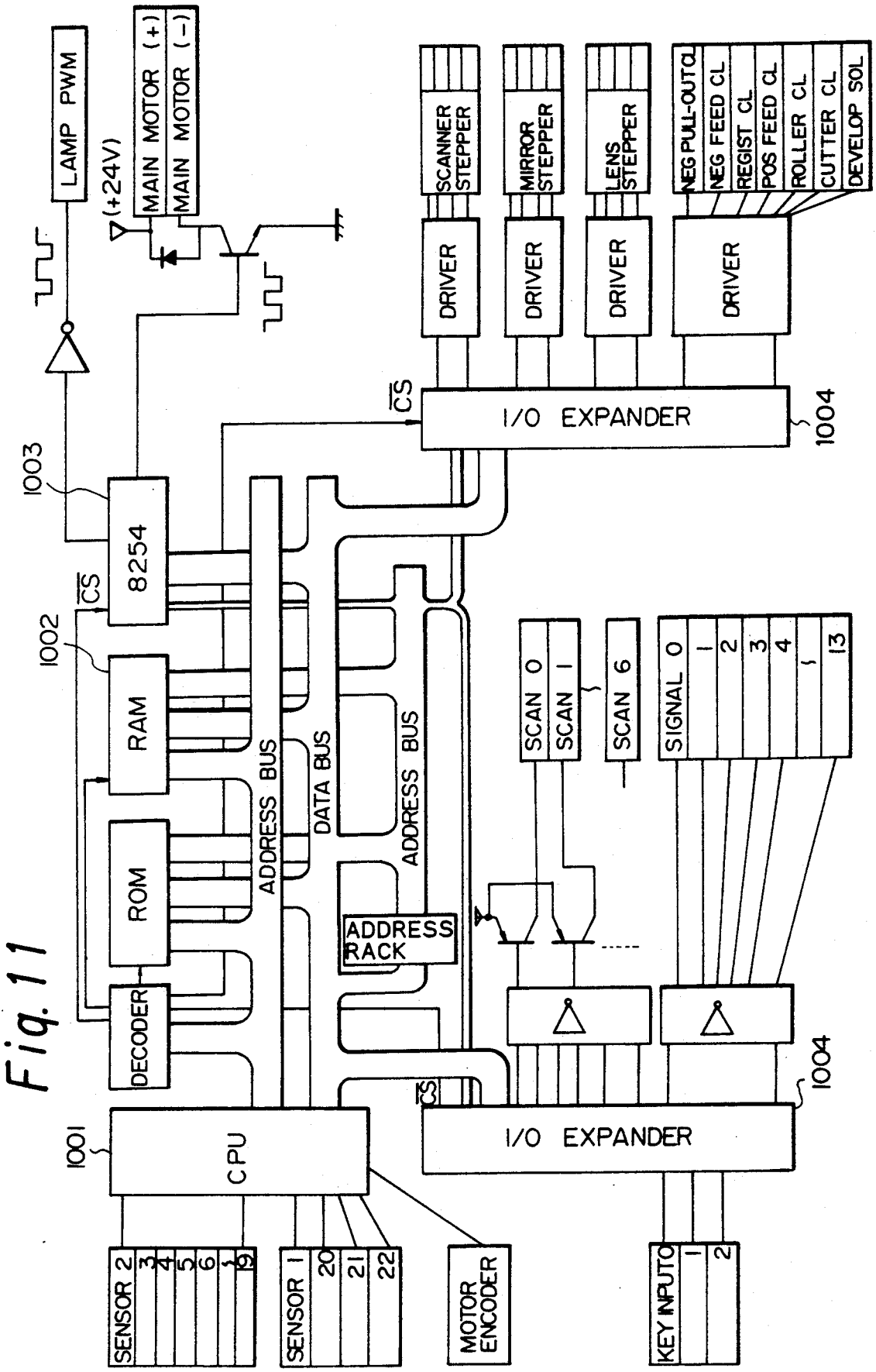
FIG. 11 is a block diagram schematically showing control circuitry for practicing the present invention.

Referring to FIG. 10, the operation and display panel 500 is shown which is generally made up of an inputting section for entering various conditions, and a display section for displaying entered conditions. Specifically, the panel 500 has a print key 501 for commanding a printing operation, density keys 502a and 502b for adjusting the image density, a reduction zoom key 503a, an enlargement zoom key 503b, a 1 magnification key 503c, document-specified magnification keys 504a and 504b for specifying a document size, a positive discharge switch 505 for commanding the discharge of the positive sheet 101, a display panel 506 for displaying a jam and other troubles, entered numerical values for zooming, and messages such as "READY TO COPY", and LEDs 507 for indicating the elapse of developing time.

[IX] Control Circuit

Figure 17A:
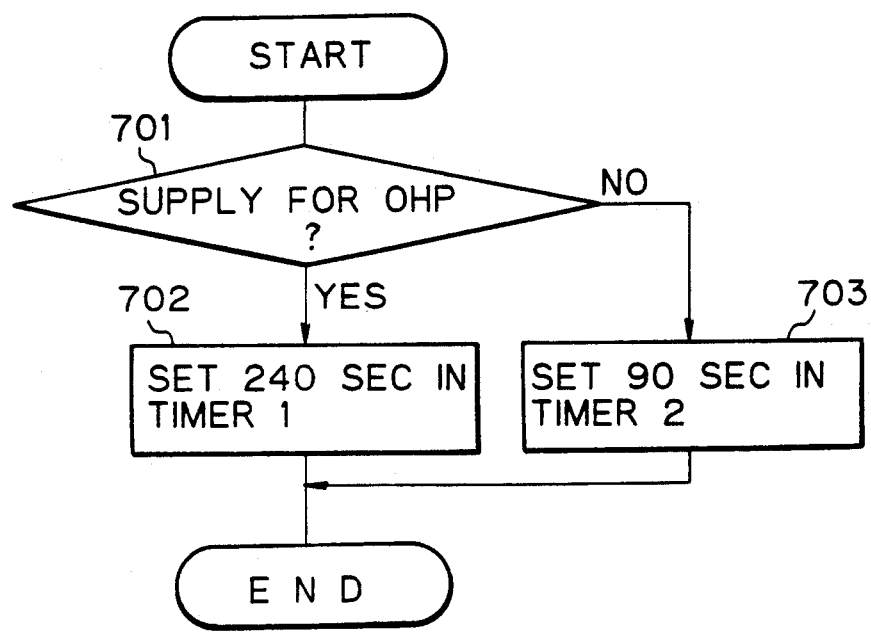
FIGS. 17A and 17B are flowcharts relating to a timer which reports a developing time.
Figure 17C:
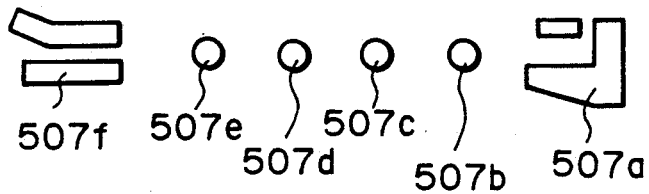
FIG. 17C shows how LEDs glow to indicate the elapse of developing time.
Figures 1, 17B:
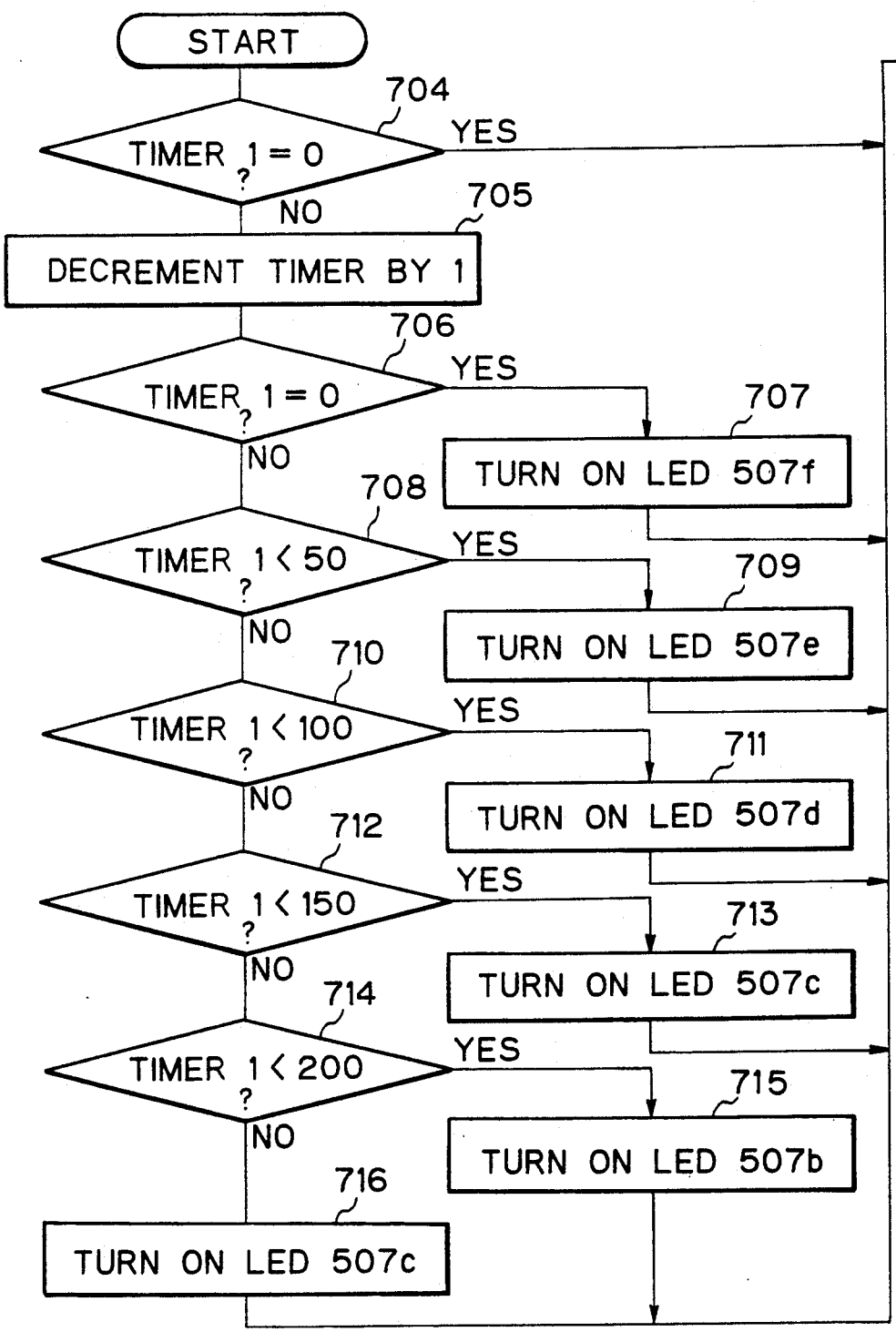
Figures 2, 17B:
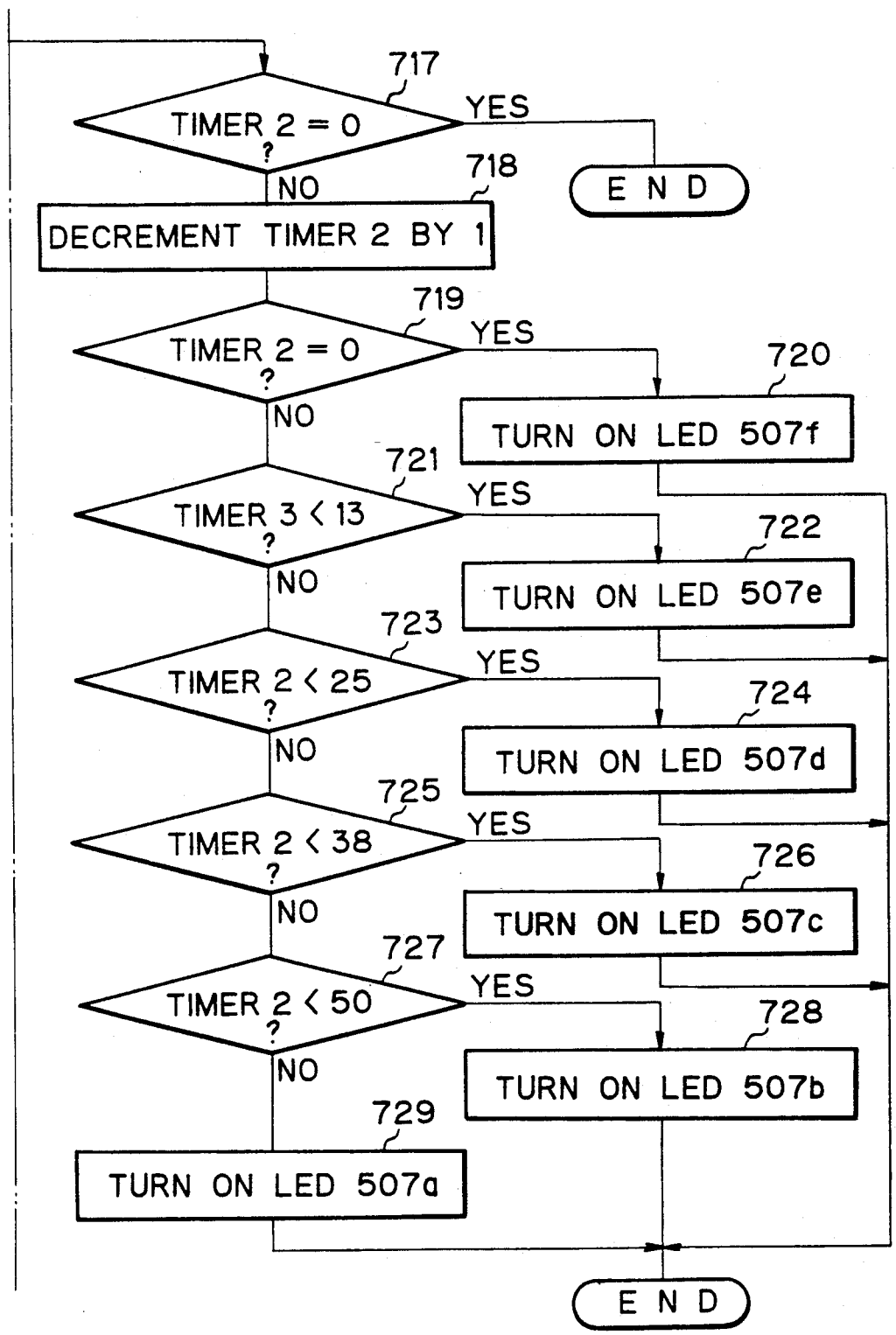

Referring to FIG. 1 the control circuit included in the illustrative embodiment has a CPU 1001 of the type having in one chip a RAM, an 8-bit timer, a 16-bit event counter, an AD converter, and a serial interface. This type of CPU may be implemented by, for example, μPD7810H available from NEC (Japan). A RAM 1002 has a rithium cell incorporated therein and has a capacity of 2 kilobytes for storing various data such as the individual data of the apparatus and the total number of sheets. 8254 (1003) generates pulses for driving the fluorescent lamp and DC servo motor (main motor). An I/O (Input-Output) expander 1004 drives various motors, clutches and solenoids and controls the operation and display panel. The rest of construction will not be described specifically.

[X] Operation of Control Section

Figure 12A:
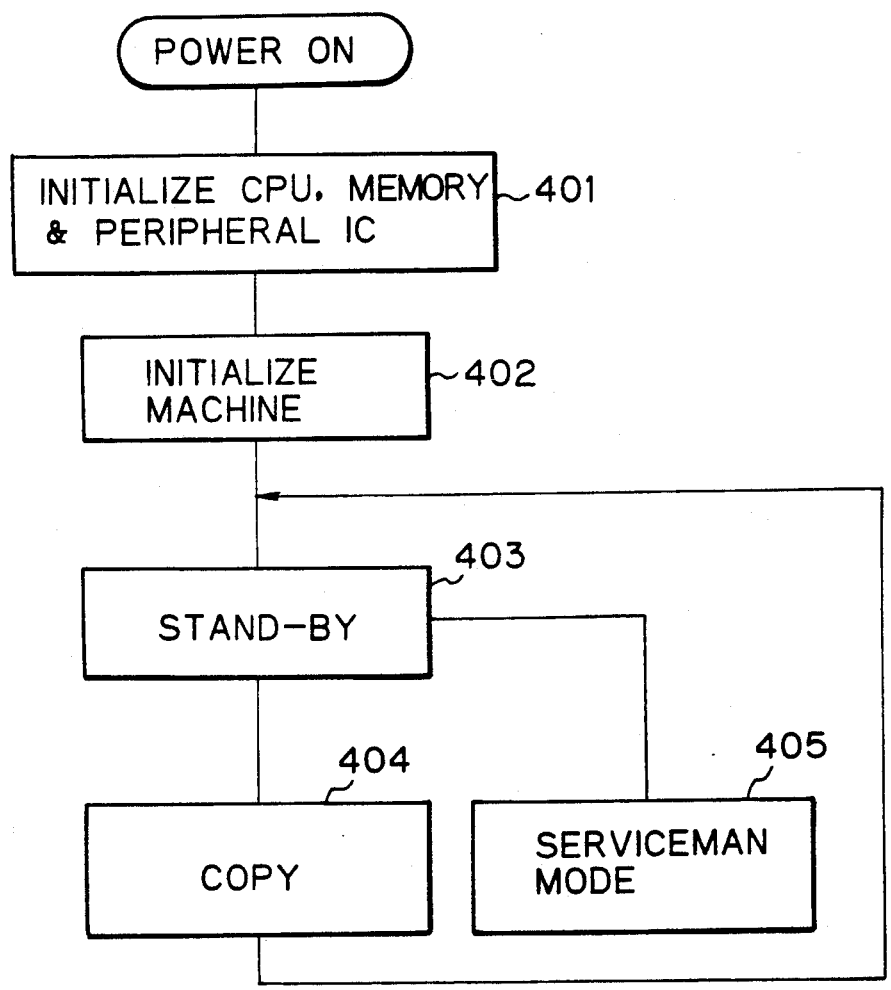
FIGS. 12A through 12E are flowcharts demonstrating an interrupt routine.
Figure 12B:
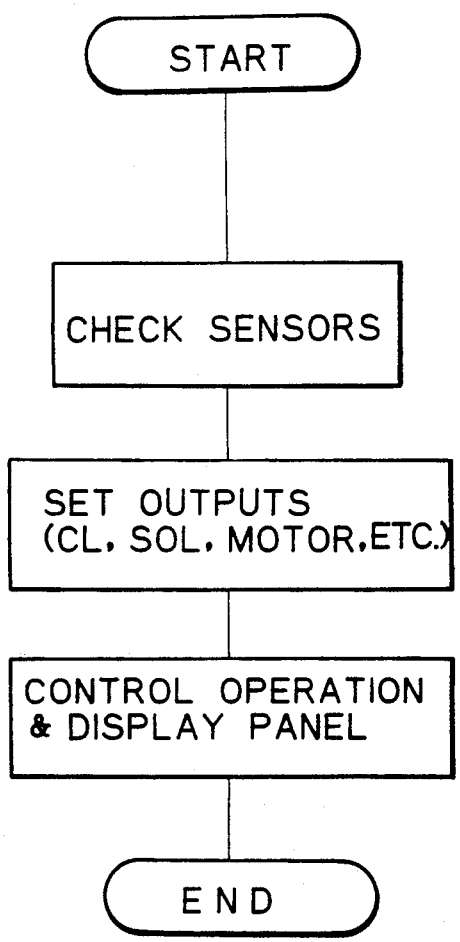
Figure 12C:
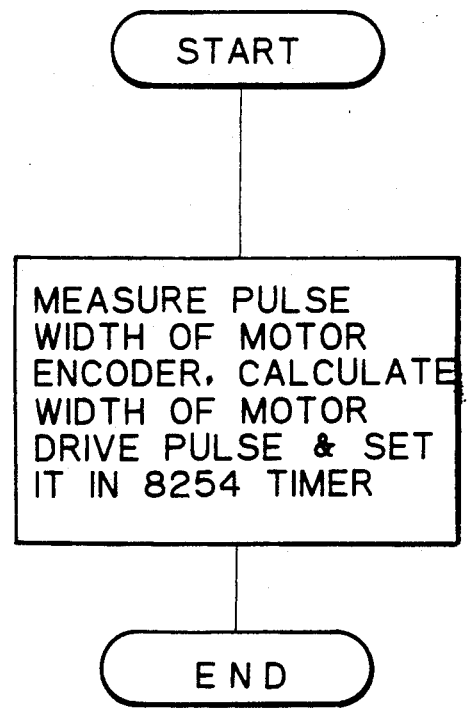
Figure 12D:
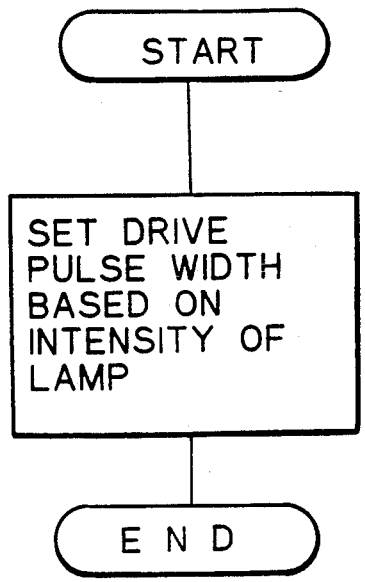
Figure 12E:
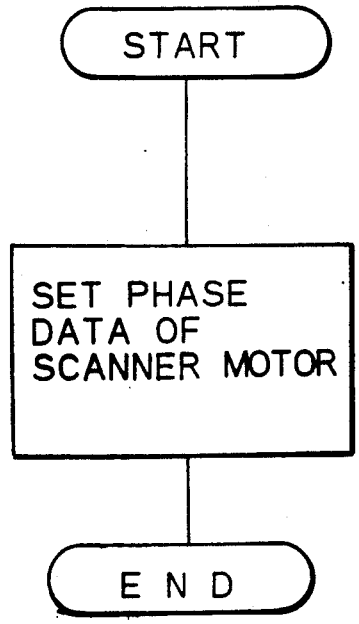

The control section 400 having the above construction is operated as follows. The control seciton 400 has a main flow shown in FIG. 12A and four different interrupt routines shown in FIGS. 12B through 12E.

The main flow refers mainly to the sequence control over the machine and the response to the operator. First, when the power switch is turned on, the CPU, memories, and peripheal ICs are intialized (step 401). After the scanner, lens, developing rollers, cutter and other mechanical components have been initialized (402), the control section executes stand-by processing to await the operator's manipulation (403). In response to a command entered by the operator, either copy processing (404) or serviceman mode processing (405) is executed. As shown in FIGS. 12B through 12E, the control section has four different interrupt routines, i.e., a 2.5 millisecond interval routine, a motor encoder routine, a lamp turn-on routine, and a scanner motor routine. The 2.5 millisecond interval routine checks and sets various I/Os and, at the same time, executes processing relating to time. The other three interrupt routines are effected only when the motor and/or the lamp is turned on and assigned to servo control and other similar control.

The main flow mentioned above will be described specifically hereinafter.

Figure 13:
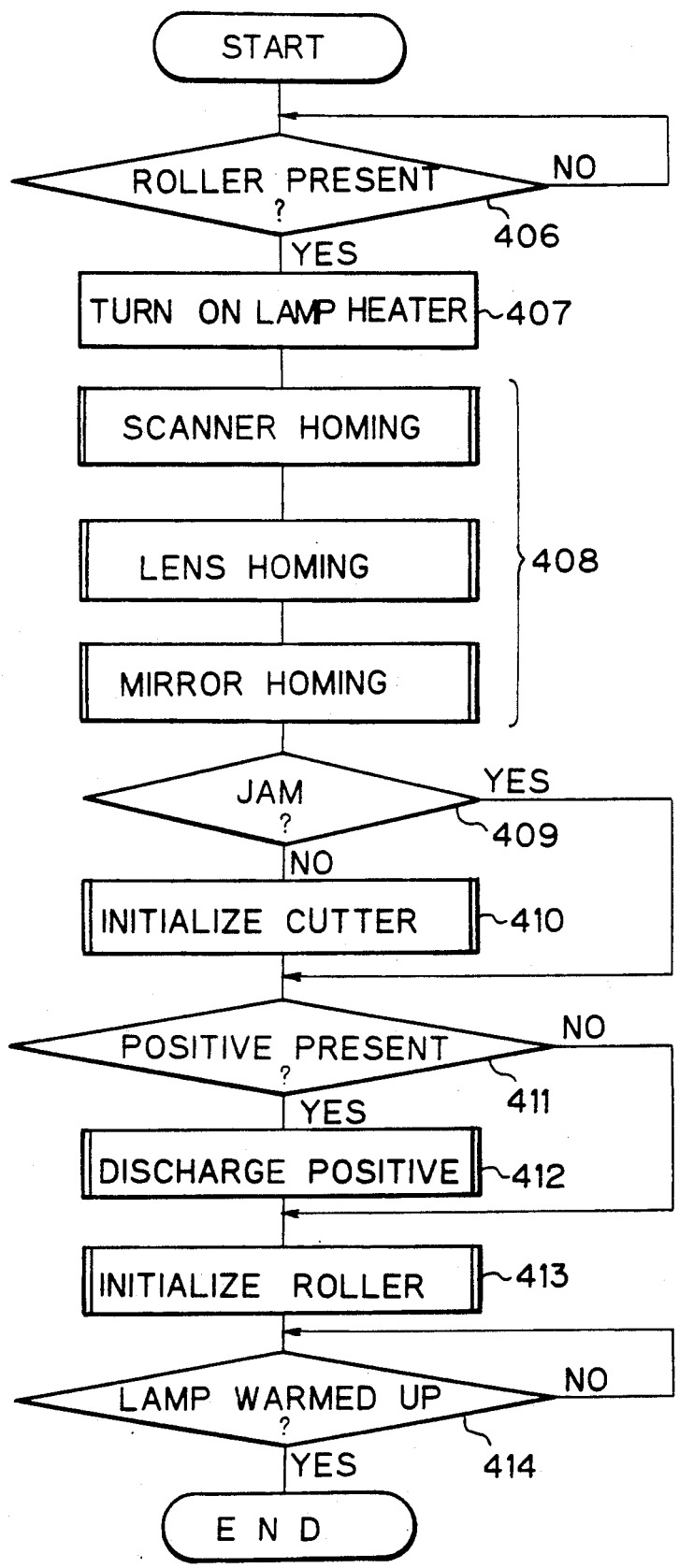
FIG. 13 is flowchart showing machine initialize processing.

FIG. 13 shows machine initialize processing. When the developing rollers are absent, the voltage of +24 vols downs and, therefore, the necessary power is not available. Therefore, whether or not the developing rollers are present is determined by the sensor S14 (406). After the lamp heater 374 has been turned on (407), the scanner, lens, mirror and other mechanical components whose states vary are initialized (408). At this instant, if the negative film 200 exists on the transport path, the cutter initializing step is not executed (409 and 410). If the positive sheet assembly 100 is present on the transport path, it is automatically discharged (411 and 412). Thereafter, the developing rollers are initialized (413). As soon as the lamp 373 has been warmed up, the procedure ends (414).

Figure 14B:
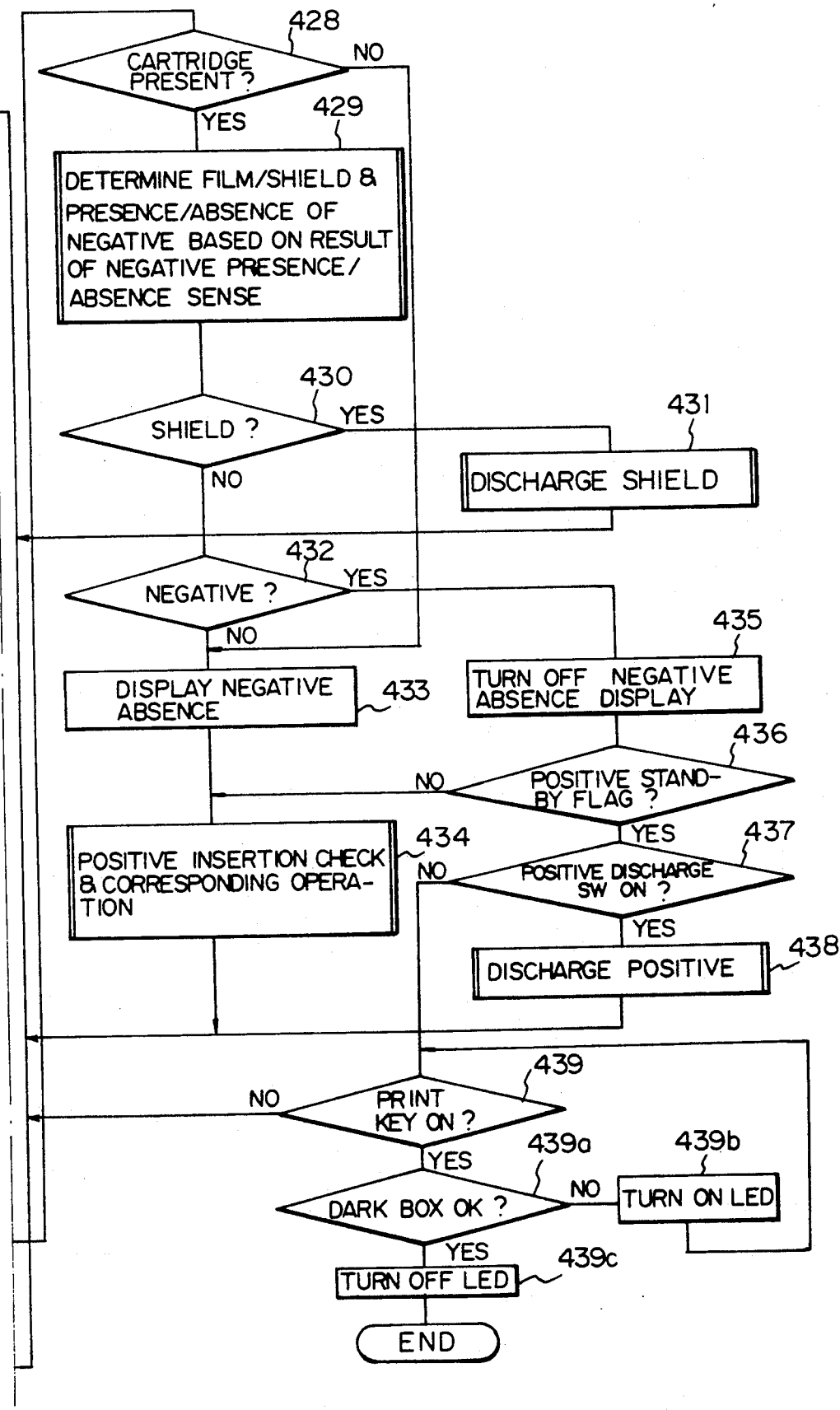
FIG. 14 is a flowchart showing stand-by processing.

FIG. 14 shows stand-by processing which basically checks the states of the machine (jam, door open-close, negative film cartridge present/absent, etc.) and, depending on the conditions, accepts the print key to hand over the job to the following copy processing. First, whether or not the sensor on the negative film transport path has sensed the negative film 200 is determined (415). If the answer of the step 415 is YES, the control section determines that a jam has occurred and thereby turns on a jam display while setting an error flag (416). Likewise, when the door is open, a door open display is turned on and an error flag is set (417 and 418). If the developing rollers are absent, a roller absence display is turned on and an error flag is set (419 and 420). Although not shown in the figure, whether or not the lid 327 of the tray or dark box 326 is present is determined, and a lid absence display is turned on and an error flag is set if the answer is negative. Subsequently, steps 421 through 424 are executed to accept the inputs on the magnification change keys and density keys on the operation and display panel 500 and to operate accordingly. At this instant, when some predetermined keys are pressed, the operation is transferred to serviceman mode processing, although not described in detail. The 3-bit black-and-white code (ID marks) provided on the side of the negative film cartridge 201 is read to determine whether or not the cartridge 201 is present and the kind of the negative film 200, and the presence/absence of the cartridge 201 and the kind of the negative film 200 are displayed (425). If an error flag is set in any one of the above-stated errors, a message associated with the error flag is displayed and the error flag is cleared (426 and 427).

If the negative film cartridge 201 is present (428), whether or not the negative film 200 is present and whether the observed part of the film 200 is a film portion are determined (429). The negative film 200 is rolled up and accommodated in the negative film cartridge 201. The roll of negative film 200 is led by the shielding sheet 208 and followed by another shielding sheet 209, as stated earlier. Hence, the sensor S8 responsive to the negative film 200 also distinguishes the film portion from the shielding sheets 209 and 209. Specifically, the sensor S8 is implemented by an infrared-ray LED and a phototransistor for receiving a reflection. The reflection incident to the phototransistor is converted by the AD converter of the CPU into 8-bit (0 to 255) data. When the negative film 200 and, therefore, the reflection is absent, the data is almost zero. When the rear surface (black) of the film portion is sensed, a small amount of light is reflected and, therefore, the data is about 100 to 120. On the other hand, the shielding sheets 208 and 209 each has a higher reflectance than the rear surface of the film portion, so that the data will be greater than 200. In this manner, the CPU is capable of determining whether or the negative film 200 is present and, at the same time, distinguishing the film portion and the shielding sheets.

When the sensed part of the negative film 200 is not the film portion, an operation for discharging the shielding sheet 208 or 209 is performed (430 and 431). If the sensed shielding sheet leading the film portion is sensed, discharging it as mentioned above causes the film portion to be sensed next. Then, the transport is interrupted, and the shielding sheet is cut by the cutter and then driven out of the apparatus. If the sensed shielding sheet following the film portion is sensed, the absence of the film is detected so that the shielding sheet is driven out immediately. On the other hand, if the answer of the step 430 is NO, a step 432 is executed. If the answer of the step 432 is NO, meaning that the negative film 200 is absent, a negative film absence display is turned on (433), and then decision as to whether or not a positive sheet has been inserted is made and corresponding operations are executed (434). If the answer of the step 432 is YES, the negative film absence display is turned off and the status of a positive sheet stand-by flag (indicating that a positive sheet is ready) is determined (435 and 436). If this is flat is set, whether or not a positive sheet discharge switch is in an ON state is determined (437). If the answer of the step 437 is YES, a positive sheet discharging operation is performed (438); if otherwise, the step 415 and successive steps are repeated until the print key has been turned on (439). On the turn-on of the print key, the conditions of the dark box (tray 326 and lid 327) are examined (439a). Specifically, whether or not the joined sheets 100 and 200 are present in the dark box in determined by referencing the output of the sensor S7, and whether or no the lid 327 is open is determined by referencing the output of the sensor S9. If the sensors S7 and S9 are respectively in an OFF state and an ON state, i.e., the conditions of the dark box are not OK, the LED 507 is turned on to inform the operator of the error of the tray 326 (439b), and then the program returns to the step 439. IF the dark box is OK (sensor S7 is an OFF state and sensor S9 in an ON state), the LED 507 is turned off, and the processing ends (439c).

It is to be noted that when the operator presses a positive sheet discharge switch 505 provided on the operation board 500, the positive sheet discharge switch is turned on. Hence, even after all the copying conditions have been completed with a positive sheet assembly 100 having been inserted, the operator may cause the positive sheet assembly 100 to be automatically discharged, as desired.

Figure 15A:
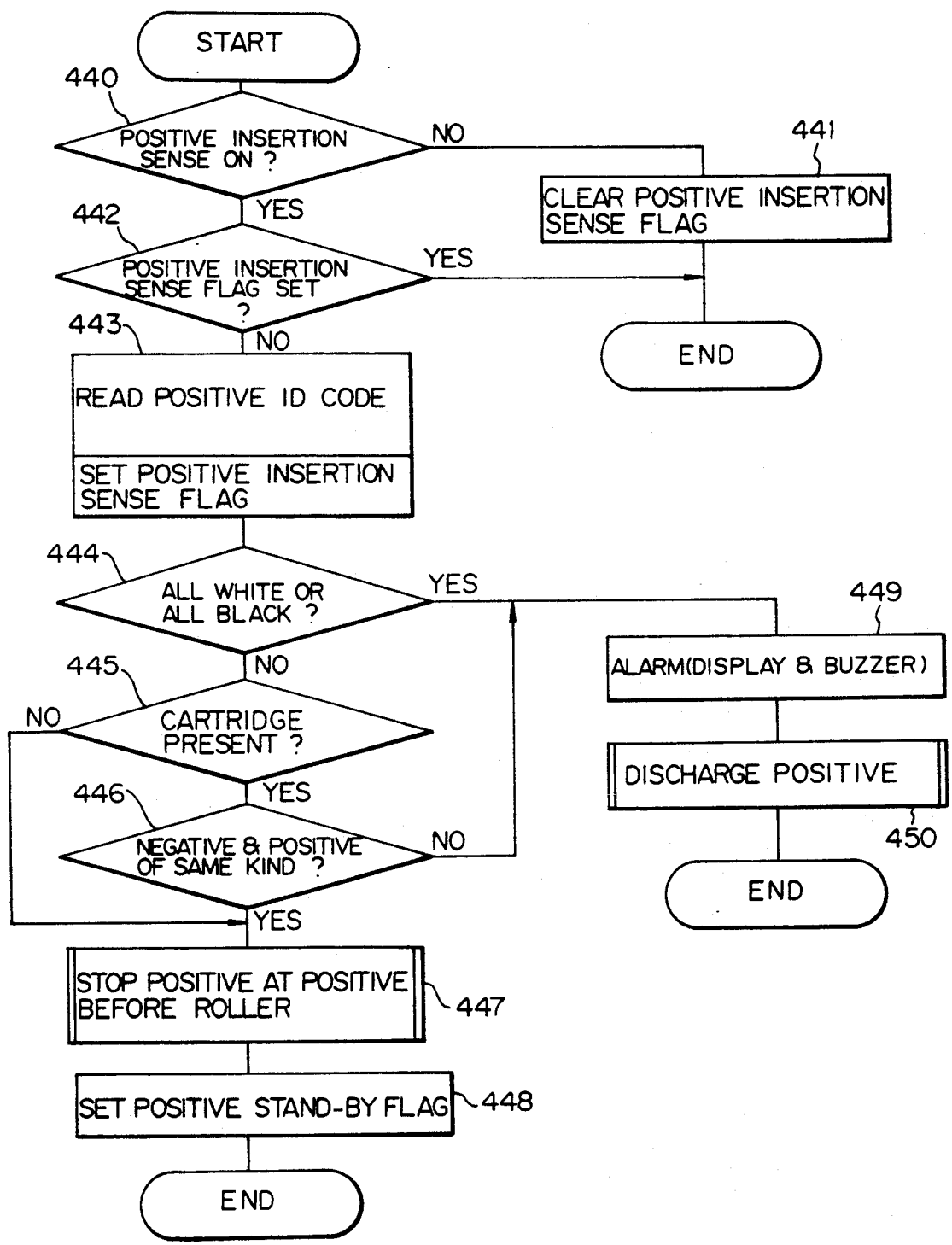
FIG. 15A is a flowchart showing a positive sheet insertion check routine and corresponding operations.

FIG. 15A shows a positive sheet insertion check and corresponding operation routine (step 434, FIG. 14). This routine determines whether or not a positive sheet assembly 100 has been inserted on the basis of the output of the sensor S5 and reads the ID code thereof (marks M1, M2 and M3) in response to the output of the sensor S10. When the kind of the positive sheet assembly 100 and that of the negative film 200 coincide, the assembly 100 is transported to the predetermined position before the developing rollers and brought to a stop there. If they do not coincide, the positive sheet assembly 100 is driven out of the apparatus.

Figure 15B:
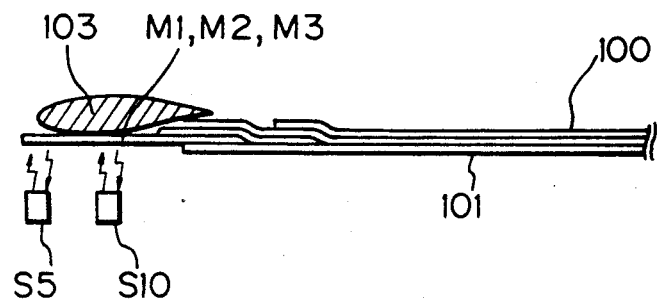
FIGS. 15B and 15C show a specific arrangement of a positive sheet ID code (marks M1, M2 and M3)

Specifically, when the positive sheet assembly 100 is inserted into the apparatus, the sensor S5 senses it. An arrangement is made such that at the moment when the sensor S5 senses the positive sheet assembly 100, the marks M1, M2 and M3 will have been located at the sensor S10, as shown in FIG. 15B. When the sensor S5 senses the positive sheet assembly 100, it is determined that the assembly 100 has reached the predetermined position, i.e., the ID code (marks M1, M2 and M3) can be read. Hence, if the positive sheet assembly 100 is not sensed, a positive insertion flag is cleared, and the processing ends (440 and 441). If the positive sheet assembly 100 is sensed, whether or not the leading edge of the assembly is sensed is determined on the basis of the positive insertion flag. In the illustrative embodiment, when the positive insertion detection is ON and the positive insertion flag is not set, it is determined that the positive sheet assembly 100 is sensed for the first time, i.e., the leading edge of the assembly 100 is sensed. Hence, if the answer of a step 442 is NO, the ID code of the positive sheet assembly 100 is read, and the positive insertion flag is set to show that the ID has been read (433).

Figure 15C:
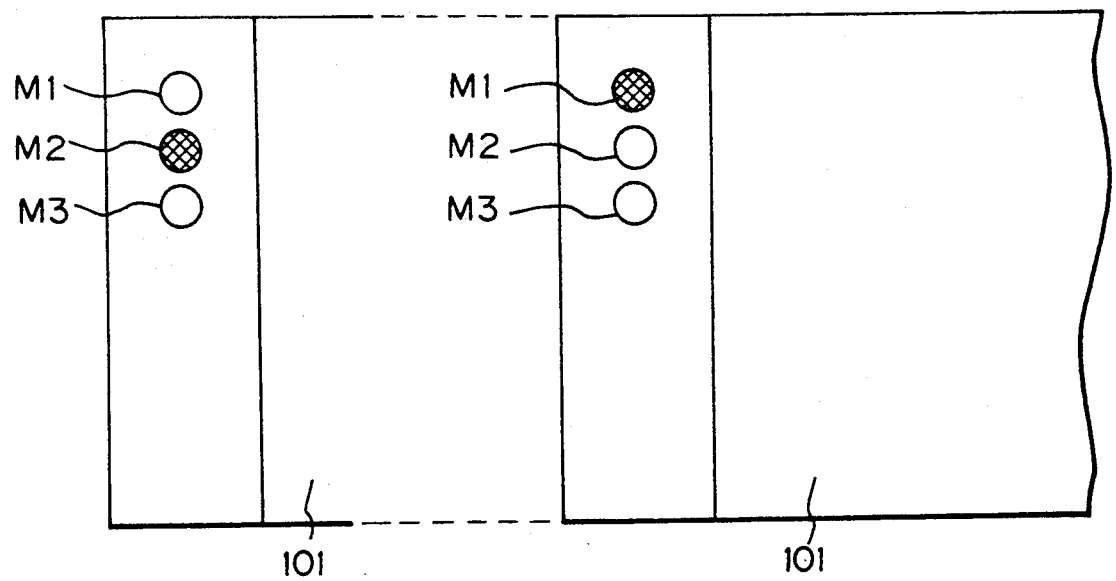

As shown in FIG. 15C, the ID code provided on the positive sheet assembly 100 is implemented as a black-and-white pattern constituted by the marks M1, M2 and M3. The code representative of the kind of the positive sheet assembly 100 is allotted to the individual marks M1, M2 and M3 all of which are white or black are determined to be an invalid code. Hence, when the positive sheet assembly 100 is inserted upside down or in a position reversed in the longitudinal or lateral direction, i.e., when the sensor S10 senses an all white pattern or an all black pattern, it is determined that the positive sheet assembly 100 is inserted in an wrong position. Then, a message "PAPER" is displayed on the operation board 500 and a buzzer is turned on, thereby alerting the operator to the wrong position of the assembly 100 (444 and 449), whereafter the assembly 100 is discharged (450). On the other hand, when the marks M1, M2 and M3 are not in an all white or an all black pattern, whether or not the negative film cartridge is present is determined (445). If the answer of the step S445 is YES, whether the kind of the negative film and that of the positive sheet coincide is determined (446). If they are coincident, the positive sheet assembly 100 is stopped at the predetermined position before the developing rollers, a positive stand-by flag is set, and then the processing ends (447 and 448). If the answer of the step 446 is NO, it is determined that the positive sheet assembly 100 is in a wrong position. Then, the message "PAPER" on the operation board 500 is turned on and the buzzer is turned, as stated above (444 and 449). When the negative film cartridge is not mounted as determined in the step 445, the positive sheet assembly 100 is stopped at the position before the developing rollers, the positive stand-by flag is st, and then the program ens (447 and 448).

Figure 16B:
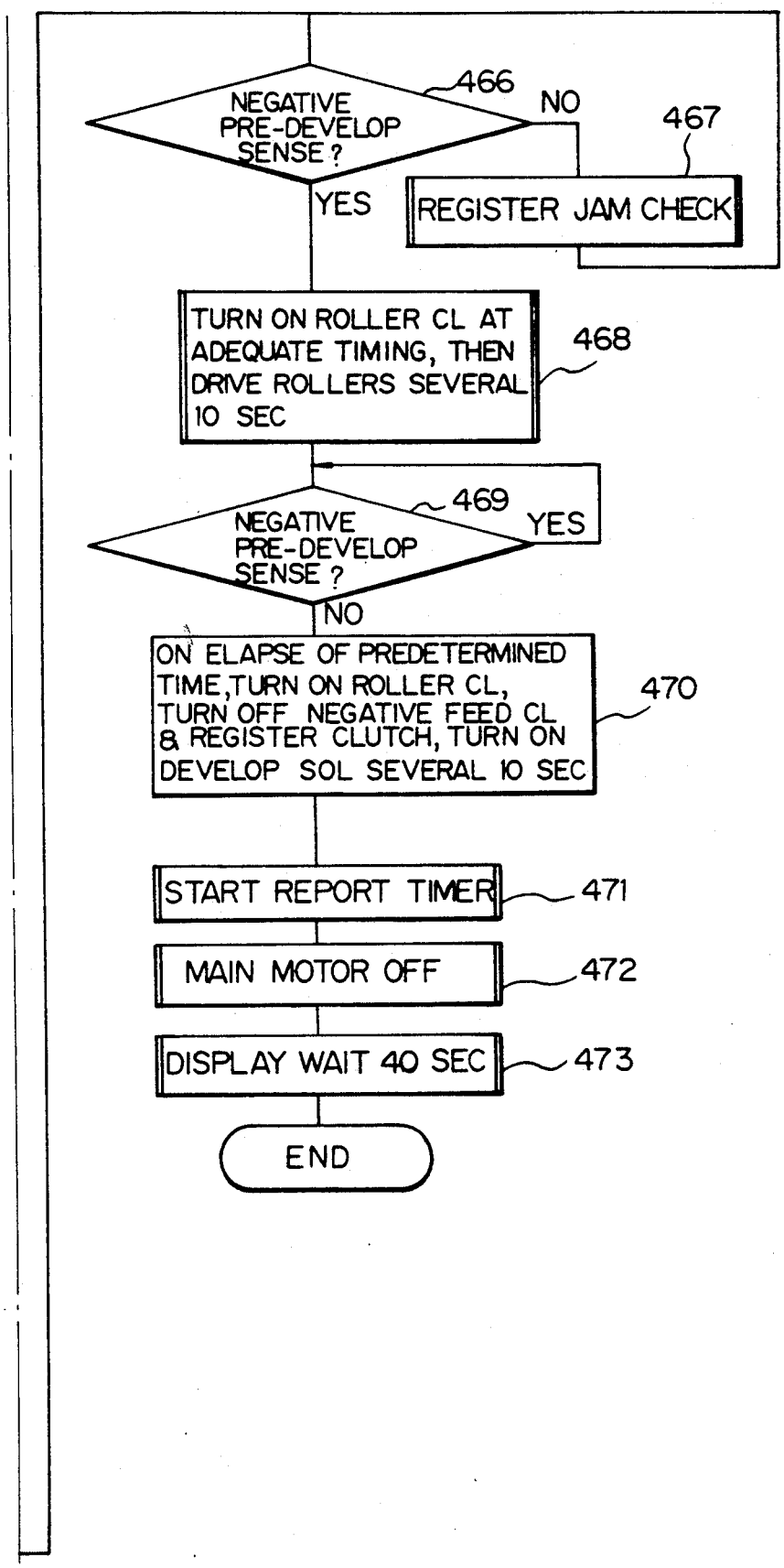
FIG. 16 is a flowchart demonstrating copy processing.

FIG. 16 shows copy processing. As shown, on the turn-on of the print key, whether or not a 35 millimeter project mode is selected is determined (451). If the answer of the step 451 is No, the fluorescent lamp is turned on (452); if otherwise, a step 453 is executed. In the step 453, the main motor, negative pull-out clutch and negative feed clutch are coupled (453) to start transporting the negative film 200. When the sensor 1 senses the leading edge of the negative film, the scanner begins moving at a particular time matching the entered magnification and mode (454 and 456). When the sensor 1 does not sense the leading edge of the negative film, a non-feed jam check subroutine is executed; if the sensor 1 does not sense it within a predetermined period of time, it is determined that a non-feed jam has occurred (459), and the opertion is transferred to a jam process routine which will be described.

The sensors S2 and S3 (negative film midway sense (1) and (2)) perform jam checking in the same manner (456, 457, 460 and 461). After the negative film 200 has been fed to the negative film midway sense (2), the transport is interrupted as soon as the film 200 is paid out by one frame. Then, the scanner is returned (reversed), the cutter is rotated to cut the film 200, and then the transport of the film 200 is resumed (458 through 464). Thereafter, as soon as the negative film 200 abuts against the register roller and bent at its leading edge, the register roller is rotated. Stated another way, the register roller is rotated at a predetermined time to free the negative film 200 from skew (465). The negative film 200 moved away from the register roller is sensed by the sensor S4 (negative pre-develop sense) and, on the lapse of a predetermined period of time, the developing rollers are driven to develope the negative film 200 (446 and 468). At this instant, jam checking is executed on the basis of the period of time after the turn-on of the register-clutch. If the negative pre-develop sense does not sense the negative film 200 even after a predetermined period time has elapsed, it is determined that a register jam has occurred (467). After the negative pre-develop sense (sensor S4) has sensed the trailing edge of the negative film 200, the developing rollers are stopped on the elapse of a predetermined period of time, and then the developing rollers are moved away from each other (469 and 470). At this time, a timer for reporting the developing time is started (471). Although not shown in the flowchart, when negative presence sense (sensor S8) produces data indicative of the shielding sheet during the above-stated copying operation, the CPU determines whether or not the negative film 200 having been paid out is long enough to form an image (1, FIG. 2A) and, if the answer is negative, interrupts the copying operation and discharges the negative film 200 and the positive sheet assembly 100. If the negative film 200 having been paid out is long enough to form an image, the CPU executes the copying operation as demonstrated in the flowchart, except for the cutter step, while paying out the whole negative film 200 from the negative film cartridge 201. After the main motor has been turned off (472), the time for which the joined sheets 100 and 200 should be held in the dark box or tray 326 (40 seconds) is counted and displayed. (473).

[XI] Timer Reporting Developing Time

Referring to FIGS. 17A and 17B, a sequence of steps relating to the timer which reports the developing time will be outlined. First, on the start of the timer (step 471, FIG. 16), whether or not the supply is for OHP is determined on the basis of the positive sheet ID code sensed by the sensor S10 (supply detecting means) (701). If the answer of the step S701 is YES, the developing time for OHP supplies (240 seconds) is set in the timer 1 (702); if otherwise, the normal developing time (90 seconds) is set in the timer 2. Subsequently, the display routine shown in FIG. 17B is called every second to decrement the corresponding timer 1 or timer 2. At the time same, the LEDs 507 (507a through 507f, FIG. 17C) are sequentially turned on as the time elapses. Specifically, the LED 507a glows until 40 seconds expires (i.e. just after the timer has begun counting the developing time), indicating that the joined sheets 100 and 200 should not be taken out from the dark box or tray 326. The LED 507f indicates the end of development. The other LEDs 507b, 507c, 507d and 507e each reports the time elapsed.

The display routine determines in which of the timers 1 and 2 the developing time is set by determining whether or not the timer 1 is zero (values other than zero meaning that development is under way) (704). If the answer of the step 704 is YES, whether or not the timer 2 is zero is determined (717). That both of the timers 1 and 2 are zero means that the development has completed. The control section 400 respectively calls the display routine every second until both of the timers 1 and 2 become zero.

The relation between the display routine and the LEDs 507 will be described on the assumption that the timer 1 is 240 and the timer 2 is zero. First, since the timer 1 is 240, the controller 400 determines that the supply for OHP is in development (704) and then advances to a step 705. In the step 705, the timer 1 is decremented by 1. The resulted value of the timer 1 is 239 and, therefore, does not satisfy any of the conditions shown in steps 706, 708, 710, 712 and 714. As a result, a step 716 is executed to turn on the LED 507a. The turn-on of the LED 507a indicates that the development has just begun (i.e. 40 seconds has not expired after the start of development). Then, since the timer 2 is zero as determined in a step 717, the program ends.

As the display routine is called every second, the LEDs 507 are sequentially turned on the basis of the value of the timer 1, as follows. When the timer 1 is decremented to less than 200, steps 714 and 715 are executed to turn on the LED 507b. As the timer 1 is decremented to less than 150, the LED 507c is turned on by steps 712 and 713. On the decrease of the timer 1 to less than 100, the LED 507d is turned on by steps 710 and 711. When the timer 1 is decremented to less than 50, the LED 507e is turned on by steps 708 and 809. Finally, as the timer 1 reaches zero, the LED 507e is turned on by steps 706 and 707. The turn-on of the LED 507e reports the operator that the developing time has expired. Since the timer is 1 zero, i.e., since both of the timers 1 and 2 are zero, the control section 400 does not call the display routine any more and ends the processing. When the timer 1 is zero and the timer 2 is 90, the LEDs 507a through 507e are sequentially turned on by steps 718 through 728 to indicate the start of development, the elapse of developing time, and the end of development. The control section 400 energizes the buzzer simultaneously with the turn-on of the LED 507e to inform the operator of the end of developing time, although not shown in the flowchart.

In the illustrative embodiment, the dark box is removable from the apparatus and, therefore, facilitates the transport of the apparatus. When the supply outlet of the cover 329 and the neighborhood thereof are smeared by the developer, they can be readily cleaned only if the dark box is removed. Since the lid 327 is removable from the tray 326, the tray 326 can also be easily cleaned when contaminated by the developer. When the lid 327 is open or not mounted on the tray 326, a printing operation is inhibited. This eliminates the waste of expensive supplies even when the print key is pressed in inadequate conditions. Further, when the supply (joined negative and positive sheets) is not fully removed from the dark box but left on the tray 326 in a position where the sensor S7 remains in an OFF state, the projections 327b abut against the joined sheets to maintain the lid 327 in an open state. This also inhibits the printing operation and thereby eliminates the waste of supplies even when the operator presses the print key without removing the supply.

In summary, it will be seen that the present invention provides an instant photographic apparatus having a dark box which is removably mounted on the apparatus body downstream of developing rollers. The dark box is, therefore, easy to clean and handle while facilitating the transport of the apparatus. The dark box is made up of a tray for laying a negative sheet and a positive sheet joined together, or supply, thereon and a lid member rotatably and removably mounted on the tray. This further promotes the ease of cleaning and handling of the dark box. Means for sensing the open/closed position of the lid member and means responsive to the output of the first-mentioned means for inhibiting a printing operation when the lid member is open or not mounted are provided. These means are also successful in eliminating the waste of negative films and positive sheets which would occur if the development were effected without the dark box being correctly conditioned.

Supply sensing means is provided on the apparatus body downstream of the developing rollers for determining whether or not the joined negative and positive sheets with the developer having spread exists. When the supply sensing means senses the joined sheets, control means inhibits a printing operation. Hence, when the operator intends to effect the next copying operation without removing the supply from the dark box, the negative film and positive sheet are prevented from being wasted. The supply sensing means mounted on the apparatus body eliminates the need for the interchange of signals otherwise performed between the dark box and the apparatus body. More specifically, contacts or connectors for interconnecting the dark box and the apparatus body are not necessary. This not only allows the dark box to be removably mounted on the apparatus body but also enhances reliable detection of a supply.

The lid member has projections which are located at the non-image sides of the negative and positive sheets joined together and in such a position that they abut against the leading edge of the joined sheets when the trailing edge of the sheets moves away from the supply sensing means. This, coupled with the fact that the tray has recesses engagable with the projections, insures accurate decision as to the presence/absence of a supply in the dark box and thereby surely eliminates the waste of expensive negative films and positive sheets.

Further, the apparatus has dark box sensing means for sensing the dark box and control means responsive to the output of the dark box sensing means for inhibiting a printing operation when the dark box is not mounted. This also eliminates the waste of the negative films and positive sheets ascribable to development effected under incomplete setting of the dark box.

Various modifications will become possible for those skilled in the art after receiving the teachings of the present disclosure without departing from the scope thereof.

What is claimed is:

1. A peel-apart type instant photographic apparatus using a combination of a negative film and a positive sheet, comprising:
    developing rollers; and
    a dark box removably mounted on a body of said apparatus downstream of said developing rollers for developing and accommodating a negative film and a positive sheet joined with each other and having a developer spread therebetween.

2. An apparatus as claimed in claim 1, wherein said dark box comprises a supply loading member for loading the laminate thereon, and a lid member rotatably and removably mounted on said supply loading member.

3. An apparatus as claimed in claim 2, further comprising:
    lid sensing means for determining whether or not said lid member is open and whether or not said lid member is present; and
    control means responsive to an output of said lid sensing means for inhibiting a printing operation when said lid member is open or when said lid member is not mounted on said supply loading member.

4. An apparatus as claimed in claim 3, further comprising supply sensing means mounted on said body of said apparatus downstream of said developing rollers for sensing the joined negative film and positive sheet, said control means inhibiting a printing operation when said supply sensing means determines that the joined negative film and positive sheet are present.

5. An apparatus as claimed in claim 4, wherein said lid member comprises a projection located at a non-image side of the joined negative film and positive sheet and in such a position that said projection abuts against the leading edge of the joined negative film and positive sheet when the trailing edge of the joined negative film and positive sheet move away from said supply sensing means;

said supply loading member comprising a recess with which said projection of said lid member mates.

6. An apparatus as claimed in claim 1, further comprising:

dark box sensing means for determining whether or not said dark box is present; and control means responsive to an output of said dark box sensing means for inhibiting a printing operation when said dark box is not mounted.

* * * * *